United States Patent
Zhang

(10) Patent No.: US 10,271,251 B2
(45) Date of Patent: Apr. 23, 2019

(54) METHOD AND APPARATUS FOR DATA TRANSMISSION

(71) Applicant: HUAWEI TECHNOLOGIES CO., LTD., Shenzhen, Guangdong (CN)

(72) Inventor: Lixue Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 147 days.

(21) Appl. No.: 15/381,744

(22) Filed: Dec. 16, 2016

(65) Prior Publication Data
US 2017/0099620 A1 Apr. 6, 2017

Related U.S. Application Data

(63) Continuation of application No. PCT/CN2014/080026, filed on Jun. 17, 2014.

(51) Int. Cl.
*H04W 36/02* (2009.01)
*H04W 36/14* (2009.01)
*H04W 36/00* (2009.01)
*H04W 36/08* (2009.01)

(52) U.S. Cl.
CPC ...... *H04W 36/023* (2013.01); *H04W 36/0011* (2013.01); *H04W 36/08* (2013.01); *H04W 36/14* (2013.01)

(58) Field of Classification Search
CPC ........... H04W 36/023; H04W 36/0011; H04W 36/08; H04W 36/14
See application file for complete search history.

(56) References Cited

U.S. PATENT DOCUMENTS 7,515,565 B2  4/2009 Kalhan
8,817,636 B2  8/2014 Song et al.
(Continued)

FOREIGN PATENT DOCUMENTS

CN  1428949  7/2003
CN  101573930  11/2009
(Continued)

OTHER PUBLICATIONS

Japanese Notice of Allowance dated Feb. 13, 2018 in corresponding Japanese Patent Application No. 2016-573919, 3 pgs.
(Continued)

*Primary Examiner* — Rhonda L Murphy
(74) *Attorney, Agent, or Firm* — Staas & Halsey LLP

(57) ABSTRACT

A network device and UE determine that the UE is handed over from a first network device to a second network device, and in a handover process, the first network device or the second network device sends a feedback control message to the UE to query for a quantity of fountain codes that are needed to continue to send, and the second network device continues to perform encoding according to the quantity of fountain codes that are needed to continue to send, and sends encoded data to the UE. In an uplink process, the UE sends a feedback control to the second network device and obtains a quantity of data packets that are needed to continue to encode, and sends a first data packet to the second network device. A receive end performs decoding according to the received first data packet to obtain an original data packet.

8 Claims, 15 Drawing Sheets

(56) References Cited

U.S. PATENT DOCUMENTS

2006/0251026 A1 11/2006 Kalhan
2011/0110330 A1 5/2011 Kim et al.
2012/0236789 A1* 9/2012 Dravida ............... H04L 47/14
370/328

FOREIGN PATENT DOCUMENTS

| JP | 2008-541620 | 11/2008 |
|----|-------------|---------|
| WO | 2005004365 A2 | 1/2005 |
| WO | 2007130012 A1 | 11/2007 |
| WO | 2010/124435 | 11/2010 |

OTHER PUBLICATIONS

3GPP SA4-PSM SWG#6 Tdoc S4-AHP142, "Raptor MBMS file download specification", Digital Fountain, Oct. 11-13, 2004, total 10 pages.

Sanjay Dhar Roy et al., "Downlink Multimedia Services in CDMA Network with Fountain Code and Soft Handoff", 2010 Annual IEEE India Conference (INDICON), total 6 pages.

Surachai Chieochan et al., "Wireless Fountain Coding with IEEE 802.11e Block ACK for Media Streaming in Wireline-cum-WiFi Networks: A Performance Study", IEEE Transactions on Mobile Computing, vol. 10, No. 10, Oct. 2011, total 18 pages.

Xiaofei Di et al., "Cooperative Multi-Relay Transmission for High-Speed Railway Mobile Communication System with Fountain Codes", 2013 IEEE, total 6 pages.

Extended European Search Report, dated Jul. 31, 2017, in European Application No. 14894828.4 (11 pp.).

Qi Liao et al., "A Virtual Soft Handover Method Based on Base Station Cooperation with Fountain Codes", European Wireless 2011, Apr. 27-29, 2011, Vienna, Austria, pp. 51-56.

Chinese International Search Report dated Mar. 23, 2015 in corresponding International Patent Application No. PCT/CN2014/080026, 4 pages.

International Search Report dated Mar. 23, 2015 in corresponding International Application No. PCT/CN2014/080026.

* cited by examiner

METHOD AND APPARATUS FOR DATA TRANSMISSION

CROSS-REFERENCE TO RELATED APPLICATIONS

This application is a continuation of International Application No. PCT/CN2014/080026, filed on Jun. 17, 2014, the disclosure of which is hereby incorporated by reference in its entirety.

TECHNICAL FIELD

Embodiments of the present invention relate to the communications field, and in particular, to application of a fountain code technology to an LTE system.

BACKGROUND

With development of communications technologies, data and information transmission through a network has become an important manner for people to communicate information, and a data transmission scale is increasingly large. In an application process of a service such as large-scale data transmission or reliable broadcast/multicast, a blocking problem usually occurs in data transmission.

In the prior art, in common mobile communications networks such as a Long Term Evolution (Long Term Evolution, LTE for short), a Universal Mobile Telecommunications System (Universal Mobile Telecommunications System, UMTS for short), a short-range wireless communications technology Wi-Fi, and Bluetooth, the data transmission blocking problem is usually resolved by using a fountain code encoding method. In a fountain code encoding manner, a transmit end may combine multiple data packets that need to be sent to a receive end, then split the multiple data packets to obtain multiple equal-length original data packets, and encode the equal-length original data packets to obtain encoded data packets. Generally, a quantity of the encoded data packets is greater than a quantity of the original data packets. In this case, as long as a proper encoding codebook is selected, it can be ensured that the receive end can restore the original data packets in a case in which the receive end fails to receive all of the encoded data packets (but a quantity of encoded data packets that are correctly received needs to be at least greater than or equal to the quantity of the original data packets). In the prior art, a fountain code technology may be applied to an LTE network to transmit a user-plane data packet, for example, applied to a PDCP layer, an RLC layer, or a MAC layer, but cannot resolve a handover scenario problem.

SUMMARY

In view of this, embodiments of the present invention provide a method and an apparatus for continuing to send a data packet by using a fountain code when a terminal is handed over between corresponding serving cells. The technical solutions of the present invention may be applied to various wireless communications systems, such as a Global System for Mobile Communications (Global System for Mobile Communications, GSM for short), a general packet radio service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, or a Worldwide Interoperability for Microwave Access (World Interoperability for Microwave Access, WiMAX for short) system.

In the present invention, a network side device may be a base station. The base station may be a base station controller (Base Station Controller, BSC for short) in a GSM system, a GPRS system, or a CDMA system, may be an Evolved NodeB (Evolved NodeB, eNB for short) in an LTE system, or may be a network element such as an access service network base station (Access Service Network Base Station, ASN BS for short) in a WiMAX network. UE may be a device such as a mobile phone or a tablet computer. The present invention is described by using an eNB and UE as examples, but does not limit types of the base station and terminal apparatus.

According to a first aspect, the present invention provides a method for continuing to send a data packet by using a fountain code when a terminal is handed over between corresponding serving cells, including: sending, by a first network device, at least one first data packet to UE, where the first data packet is obtained by encoding an original data packet, the original data packet is data that needs to be sent to the UE, and a quantity of first data packets is greater than a quantity of original data packets; determining, by the first network device, that the user equipment UE needs to be handed over from the first network device to a second network device; sending a feedback control message to the UE, where the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE; receiving a feedback message sent by the UE, where the feedback message includes the indication information of the remaining sending quantity; and sending an original data packet message to the second network device, to instruct the second network device to continue to send a first data packet to the UE according to the original data packet message, where the original data packet message includes the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets.

In a first possible implementation manner of the first aspect, the present invention provides an implementation manner, where that the first data packet is obtained by encoding an original data packet includes: obtaining a first codebook, where the first codebook includes a codebook vector, and encoding the original data packet according to the codebook vector to obtain the first data packet; and obtaining a corresponding identifier of a first data packet corresponding to each codebook vector, where each first data packet includes a respective corresponding identifier, so that the UE determines, according to the corresponding identifier of the first data packet, a codebook vector corresponding to each first data packet, to reconstruct the original data packet.

In a second possible implementation manner of the first aspect, the present invention provides an implementation manner, where the second data packet is all the original data packets, the original data packet message further includes a codebook vector usage message, and the codebook vector usage message is used to indicate codebook vectors used by the second network device when the second network device encodes the original data packets by using the first codebook, so that the second network device obtains the first data packet that the second network device needs to continue to send to the UE, where each original data packet includes a location identifier, so that the second network device determines, according to the location identifier, a location of each original data packet during encoding.

In a third possible implementation manner of the first aspect, the present invention provides an implementation manner, where a quantity of second data packets is the remaining sending quantity k, the original data packet message further includes a codebook vector usage message, and the codebook vector usage message is used to indicate codebook vectors used by the second network device when the second network device encodes the original data packets by using the first codebook, where each original data packet includes a location identifier, so that the second network device determines, according to the location identifier, a location of each original data packet during encoding.

In a fourth possible implementation manner of the first aspect, the present invention provides an implementation manner, where the indication information of the remaining sending quantity is: the remaining sending quantity k; or a quantity of data packets that have been correctly received by the UE; or a proportion at which the UE loses a data packet; or a proportion at which the UE correctly receives a data packet.

According to a second aspect, the present invention provides an implementation manner, including: determining, by a second network device, that UE is handed over from a first network device to the second network device; receiving an original data packet message, where the original data packet message includes indication information of a remaining sending quantity k, a second data packet, and a location identifier of the second data packet, the second data packet is m data packets selected from original data packets, m≥k, the remaining sending quantity k is at least greater than or equal to a difference between a quantity of first data packets needed by the UE to correctly restore all the original data packets and a quantity of first data packets correctly received by the UE, and the location identifier of the second data packet is identifiers of locations of the selected data packets in the original data packets; encoding the second data packet according to the location identifier of the second data packet, to obtain third data packets; and sending at least k third data packets to the UE.

In a first possible implementation manner of the second aspect, the present invention provides an implementation manner, where before the encoding the second data packet, the method further includes: obtaining a first codebook, where the first codebook includes a codebook vector, and the first codebook is used to encode the second data packet.

In a second possible implementation manner of the second aspect, the present invention provides an encoding manner, where the original data packet message further includes a codebook vector usage message, and the codebook vector usage message is used to indicate codebook vectors used by the second network device when the second network device encodes the original data packets; and the encoding the second data packet according to the location identifier of the second data packet includes: each original data packet further including a location identifier, determining, according to the location identifier, a location of each original data packet during encoding by the first network device; determining, according to the codebook vector usage message, codebook vectors used by the second network device when the second network device encodes the second data packet; and encoding the second data packet in the following manner according to the used codebook vectors and the location identifier: separately multiplying an $i^{th}$ element in a $j^{th}$ codebook vector by m original data packets whose location identifiers indicate i, to obtain m multiplication results, and adding up the m obtained multiplication results, to obtain a third data packet corresponding to the $j^{th}$ codebook vector, where the $j^{th}$ codebook vector is one of the used codebook vectors.

In a third possible implementation manner of the second aspect, an implementation manner is provided, where the method further includes: obtaining each codebook vector and a corresponding identifier of a first data packet, and setting the corresponding identifier in the corresponding first data packet.

In a fourth possible implementation manner of the second aspect, an implementation manner is provided, where a value of m is a quantity of all the original data packets for encoding.

In a fifth possible implementation manner of the second aspect, an implementation manner is provided, where a value of m is the quantity k of first data packets that are needed to continue to send to the UE.

In a sixth possible implementation manner of the second aspect, an implementation manner is provided, where the indication information of the remaining sending quantity is: the remaining sending quantity k; or a quantity of data packets that have been correctly received by the UE; or a proportion at which the UE loses a data packet; or a proportion at which the UE correctly receives a data packet.

According to a third aspect, the present invention provides an implementation manner, including: receiving, by a terminal, at least one first data packet sent by a first network device, where the first data packet is obtained by encoding an original data packet, and the at least one first data packet is used to perform decoding to obtain the original data packet; determining that the terminal is handed over from the first network device to a second network device; receiving a feedback control message, where the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE; sending a feedback message to the first network device or the second network device, where the feedback message includes the indication information of the remaining sending quantity; receiving k third data packets sent by the second network device; and decoding the first data packet sent by the first network device and the third data packets sent by the second network device, to obtain the original data packets.

In a first possible implementation manner of the third aspect, an implementation manner is provided, where the decoding the first data packet sent by the first network device and the third data packets sent by the second network device, to obtain the original data packets includes: obtaining a first codebook, where the first codebook includes a codebook vector; obtaining a corresponding identifier included in the first data packet sent by the first network device, where the corresponding identifier indicates a codebook vector corresponding to each first data packet; obtaining corresponding identifiers included in the third data packets sent by the second network device, where the corresponding identifiers indicate a codebook vector corresponding to each third data packet; and decoding, according to the first codebook, the corresponding identifier included in the first data packet sent by the first network device, and the corresponding identifiers included in the third data packets sent by the second network device, the first data packet sent by the first network device and the third data packets sent by the second network device, to obtain the original data packets.

In a second possible implementation manner of the third aspect, an implementation manner is provided, where before the decoding the first data packet sent by the first network device and the third data packets sent by the second network device, to obtain the original data packets, the method further includes: decoding the k received third data packets sent by the second network device, to obtain k corresponding original data packets; and decoding, according to the k obtained original data packets, the first data packet sent by the first network device, to obtain all the original data packets.

In a third possible implementation manner of the third aspect, an implementation manner is provided, where the indication information of the remaining sending quantity is: the remaining sending quantity k; or a quantity of data packets that have been correctly received by the UE; or a proportion at which the UE loses a data packet; or a proportion at which the UE correctly receives a data packet.

According to a fourth aspect, the present invention provides an implementation manner, including: sending, by the first network device, at least one first data packet to UE, where the first data packet is obtained by encoding an original data packet, where the original data packet is data that needs to be sent to the UE, and a quantity of first data packets is greater than a quantity of original data packets; determining, by the first network device, that the user equipment UE needs to be handed over from the first network device to a second network device; and sending an original data packet message to the second network device, to instruct the second network device to continue to send a first data packet to the UE according to the original data packet message, where the original data packet message includes all the original data packets and a codebook vector usage message, and the codebook vector usage message is used to indicate codebook vectors used by the second network device when the second network device encodes the original data packets by using the codebook vectors.

In a first possible implementation manner of the fourth aspect, an implementation manner is provided, where that the first data packet is obtained by encoding an original data packet includes: obtaining a first codebook, where the first codebook includes a codebook vector, and encoding the original data packet according to the codebook vector to obtain the first data packet; and obtaining a corresponding identifier of a first data packet corresponding to each codebook vector, where each first data packet includes the corresponding identifier of the first data packet corresponding to each codebook vector, so that the UE determines, according to the corresponding identifier of the first data packet, a codebook vector corresponding to each first data packet, to reconstruct the original data packet.

According to a fifth aspect, the present invention provides an implementation manner, including: determining, by a second network device, that UE is handed over from a first network device to the second network device; receiving an original data packet message, where the original data packet message includes all original data packets and a codebook vector usage message, and the codebook vector usage message is used to indicate codebook vectors used by the second network device when the second network device encodes the original data packets by using the codebook vectors; sending a feedback control message to the UE, where the feedback control message is used to instruct the UE to send indication information of a remaining sending quantity, and the remaining sending quantity k is a quantity of first data packets that the second network device continues to send to the UE; receiving a feedback message sent by the UE, where the feedback message includes the indication information of the remaining sending quantity; encoding the original data packets according to the indication information of the remaining sending quantity and the original data packet message, to obtain at least k third data packets; and sending the third data packets to the UE according to the original data packet message.

In a first possible implementation manner of the fifth aspect, an implementation manner is provided, where the decoding the original data packets, to obtain first data packets includes: obtaining a first codebook, where the first codebook includes a codebook vector; and the original data packet message further including the codebook vector usage message, and the codebook vector usage message being used to indicate codebook vectors used when the original data packets are encoded, determining used encoding vectors from the first codebook according to the codebook vector usage message, and encoding the original data packets by using the determined codebook vectors.

In a second possible implementation manner of the fifth aspect, an implementation manner is provided, where the decoding the original data packets, to obtain first data packets includes: encoding the original data packets according to the used codebook vectors, the original data packets, and location identifiers of the original data packets: determining m original data packets, and determining a location identifier corresponding to each original data packet in the m original data packets, where the location identifier is used to indicate a location of the corresponding original data packet in all the original data packets, m≥k, and a value of k is the remaining sending quantity; and separately multiplying an $i^{th}$ element in a $j^{th}$ codebook vector by m original data packets whose location identifiers indicate i, to obtain m multiplication results, and adding up all the m obtained multiplication results, to obtain a third data packet corresponding to the $j^{th}$ codebook vector, where the $j^{th}$ codebook vector is one of the used codebook vectors.

In a third possible implementation manner of the fifth aspect, an implementation manner is provided, where the obtaining a first data packet corresponding to the $j^{th}$ codebook vector includes: obtaining a corresponding identifier of a third data packet corresponding to each codebook vector, and setting the corresponding identifier in the corresponding third data packet, where the corresponding identifier is used to indicate the codebook vector corresponding to the third data packet.

In a fourth possible implementation manner of the fifth aspect, an implementation manner is provided, where a value of m is a quantity of all the original data packets.

In a fifth possible implementation manner of the fifth aspect, an implementation manner is provided, where a value of m is the quantity k of first data packets that are needed to continue to send to the terminal apparatus.

In a sixth possible implementation manner of the fifth aspect, an implementation manner is provided, where the indication information of the remaining sending quantity is: the remaining sending quantity k; or a quantity of data packets that have been correctly received by the UE; or a proportion at which the UE loses a data packet; or a proportion at which the UE correctly receives a data packet.

According to a sixth aspect, the present invention provides an implementation manner, including: determining that UE is handed over to a second network device, where the second network device is configured to continue to receive a first data packet sent by the UE; receiving a first data packet sent by a first network device; receiving a feedback control message sent by the UE, where the feedback control message is used to instruct the second network device to send indication information of a remaining sending quantity, and the remaining sending quantity k is at least greater than or equal to a difference between a quantity of first data packets needed by the second network device to correctly restore all original data packets and a quantity of first data packets correctly received by the UE; sending a feedback message to the UE, where the feedback message includes the indication information of the remaining sending quantity; receiving at least k third data packets sent by the UE; and decoding the third data packets sent by the UE and the first data packet sent by the first network device, to obtain the original data packets.

In a first possible implementation manner of the sixth aspect, an implementation manner is provided, where the decoding the third data packets sent by the UE and the first data packet sent by the first network device, to obtain the original data packets includes: obtaining a first codebook, where the first codebook includes a codebook vector, where the third data packets sent by the UE and the first data packet sent by the first network device include corresponding identifiers, and the corresponding identifiers are used to determine a codebook vector corresponding to each first data packet; and performing decoding according to the third data packets sent by the UE, the first data packet sent by the first network device, and the first codebook, to obtain the original data packets.

In a second possible implementation manner of the sixth aspect, an implementation manner is provided, where the indication information of the remaining sending quantity is: the remaining sending quantity k; or a quantity of data packets that have been correctly received by the first network device; or a proportion at which the first network device loses a data packet; or a proportion at which the first network device correctly receives a data packet.

According to a seventh aspect, the present invention provides an implementation manner, including: sending, by UE, at least one first data packet to a first network device, where the first data packet is obtained by encoding an original data packet, the original data packet is data that needs to be sent to a network side, and a quantity of first data packets is greater than a quantity of original data packets; determining that the user equipment UE is handed over from the first network device to a second network device; sending a feedback control message to the second network device, where the feedback control message is used to instruct the second network device to send indication information of a remaining sending quantity k, and the remaining sending quantity k is at least greater than or equal to a difference between a quantity of first data packets needed by the second network device to correctly restore all the original data packets and a quantity of first data packets correctly received by the UE; receiving a feedback message sent by the second network device, where the feedback message includes the indication information of the remaining sending quantity; and sending at least k third data packets to the second network device, where the first data packet and the third data packets are used to restore the original data packets.

In a first possible implementation manner of the seventh aspect, an implementation manner is provided, where that the first data packet is obtained by encoding an original data packet includes: obtaining the original data packet, where the original data packet is a message that the UE needs to send to the first network device or the second network device; obtaining a first codebook, where the first codebook is used to encode the original data packet; and encoding the original data packet according to the original data packet and the first codebook, to obtain the first data packet.

In a second possible implementation manner of the seventh aspect, an implementation manner is provided, where the indication information of the remaining sending quantity is: the remaining sending quantity k; or a quantity of data packets that have been correctly received by the first network device; or a proportion at which the first network device loses a data packet; or a proportion at which the first network device correctly receives a data packet.

According to an eighth aspect, the present invention provides an implementation apparatus, including: a first sending unit, configured to send at least one first data packet to UE, where the first data packet is obtained by encoding an original data packet, the original data packet is data that needs to be sent to the UE, and a quantity of first data packets is greater than a quantity of original data packets; a determining unit, configured to determine that the user equipment UE needs to be handed over from the first network device to a second network device; a second sending unit, configured to send a feedback control message to the UE, where the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE; a receiving unit, configured to receive a feedback message sent by the UE, where the feedback message includes the indication information of the remaining sending quantity; and a third sending unit, configured to send an original data packet message to the second network device, to instruct the second network device to continue to send a first data packet to the UE according to the original data packet message, where the original data packet message includes the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets.

In a first possible implementation manner of the eighth aspect, an implementation manner is provided, where the apparatus further includes: an obtaining unit, configured to obtain a first codebook, where the first codebook includes a codebook vector, and encode the original data packet according to the codebook vector to obtain the first data packet, where the obtaining unit is further configured to obtain a corresponding identifier of a first data packet corresponding to each codebook vector, where each first data packet includes a respective corresponding identifier, so that the UE determines, according to the corresponding identifier of the first data packet, a codebook vector corresponding to each first data packet, to reconstruct the original data packet.

In a second possible implementation manner of the eighth aspect, an implementation manner is provided, where the second data packet is all the original data packets, the original data packet message further includes a codebook vector usage message, and the codebook vector usage message is used to indicate codebook vectors used by the second network device when the second network device encodes the original data packets by using the first codebook, so that the second network device obtains the first data packet that the second network device needs to continue to send to the UE, where each original data packet includes a location identifier, so that the second network device determines, according to the location identifier, a location of each original data packet during encoding.

In a third possible implementation manner of the eighth aspect, an implementation manner is provided, where a quantity of second data packets is the remaining sending quantity k, the original data packet message further includes a codebook vector usage message, and the codebook vector usage message is used to indicate codebook vectors used by the second network device when the second network device encodes the original data packets by using the first codebook, where each original data packet includes a location identifier, so that the second network device determines, according to the location identifier, a location of each original data packet during encoding.

In a fourth possible implementation manner of the eighth aspect, an implementation manner is provided, where the indication information of the remaining sending quantity is: the remaining sending quantity k; or a quantity of data packets that have been correctly received by the first network device; or a proportion at which the first network device loses a data packet; or a proportion at which the first network device correctly receives a data packet.

According to a ninth aspect, the present invention provides an implementation apparatus, including: a first determining unit, configured to determine that UE is handed over from a first network device to the second network device; a receiving unit, configured to receive an original data packet message, where the original data packet message includes indication information of a remaining sending quantity k, a second data packet, and a location identifier of the second data packet, the second data packet is m data packets selected from original data packets, m≥k, the remaining sending quantity k is at least greater than or equal to a difference between a quantity of first data packets needed by the UE to correctly restore all the original data packets and a quantity of first data packets correctly received by the UE, and the location identifier of the second data packet is identifiers of locations of the selected data packets in the original data packets; a first encoding unit, configured to encode the second data packet according to the location identifier of the second data packet, to obtain third data packets; and a sending unit, configured to send at least k third data packets to the UE.

In a first possible implementation manner of the ninth aspect, the present invention provides an implementation apparatus, where the apparatus further includes: a first obtaining unit, configured to obtain a first codebook, where the first codebook includes a codebook vector.

In a second possible implementation manner of the ninth aspect, the present invention provides an implementation apparatus, where the original data packet message further includes a codebook vector usage message, and the codebook vector usage message is used to indicate codebook vectors used by the second network device when the second network device encodes the original data packets; and the encoding, by the first encoding unit, the second data packet according to the location identifier of the second data packet includes: a second determining unit being configured to determine used encoding vectors from the first codebook, to encode the original data packets; a third determining unit being configured to determine, according to the location identifier, a location of each original data packet during encoding by the first network device, where each original data packet includes a location identifier; the third determining unit being further configured to determine, according to the codebook vector usage message, codebook vectors used by the second network device when the second network device encodes the second data packet; and a second encoding unit being configured to encode the original data packets according to the used codebook vectors, the original data packets, and the location identifiers: separately multiply an $i^{th}$ element in a $j^{th}$ codebook vector by m original data packets whose location identifiers indicate i, and add up all m obtained multiplication results, to obtain a third data packet corresponding to the $j^{th}$ codebook vector, where the $j^{th}$ codebook vector is one of the used codebook vectors.

In a third possible implementation manner of the ninth aspect, the present invention provides an implementation apparatus, where the second encoding unit further includes: a second obtaining unit, configured to obtain each codebook vector and a corresponding identifier of a third data packet; and a setting unit, configured to set the corresponding identifier in the corresponding third data packet.

In a fourth possible implementation manner of the ninth aspect, the present invention provides an implementation apparatus, where a value of m is a quantity of all the original data packets for encoding.

In a fifth possible implementation manner of the ninth aspect, the present invention provides an implementation apparatus, where a value of m is the quantity k of first data packets that are needed to continue to send to the UE.

In a sixth possible implementation manner of the ninth aspect, the present invention provides an implementation apparatus, where the indication information of the remaining sending quantity is: the remaining sending quantity k; or a quantity of data packets that have been correctly received by the first network device; or a proportion at which the first network device loses a data packet; or a proportion at which the first network device correctly receives a data packet.

According to a tenth aspect, the present invention provides an implementation manner, including: a first receiving unit, configured to receive at least one first data packet sent by a first network device, where the first data packet is obtained by encoding an original data packet, and the at least one first data packet is used to perform decoding to obtain the original data packet; a determining unit, configured to determine that the terminal is handed over from the first network device to a second network device; a second receiving unit, configured to receive a feedback control message, where the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE; a first sending unit, configured to send a feedback message to the first network device or the second network device, where the feedback message includes the indication information of the remaining sending quantity; a third receiving unit, configured to receive k third data packets sent by the second network device; and a decoding unit, configured to decode the first data packet sent by the first network device and the first data packets sent by the second network device, to obtain the original data packets.

In a first possible implementation manner of the tenth aspect, an implementation manner is provided, where the present invention provides an implementation apparatus, where the decoding unit further includes: a first obtaining unit, configured to obtain a first codebook, where the first codebook includes a codebook vector; a second obtaining unit, configured to obtain a corresponding identifier included in the first data packet sent by the first network device, where the corresponding identifier indicates a codebook vector corresponding to each first data packet; and a third obtaining unit, configured to obtain corresponding identifiers included in the third data packets sent by the third network device, where the corresponding identifiers indicate a codebook vector corresponding to each third data packet; and the decoding unit decodes, according to the first codebook, the corresponding identifier included in the first data packet sent by the first network device, and the corresponding identifiers included in the third data packets sent by the second network device, the first data packet sent by the first network device and the third data packets sent by the second network device, to obtain the original data packets.

In a second possible implementation manner of the tenth aspect, the present invention provides an implementation apparatus, where the apparatus further includes: an obtaining unit, configured to decode the k received third data packets sent by the second network device, to obtain k corresponding original data packets, where the decoding unit decodes, according to the k obtained original data packets, the first data packet sent by the first network device, to obtain all the original data packets.

In a third possible implementation manner of the tenth aspect, the present invention provides an implementation apparatus, where the indication information of the remaining sending quantity is: the remaining sending quantity k; or a quantity of data packets that have been correctly received by the UE; or a proportion at which the UE loses a data packet; or a proportion at which the UE correctly receives a data packet.

According to an eleventh aspect, the present invention provides an implementation apparatus, including: a first sending unit, configured to send at least one first data packet to UE, where the first data packet is obtained by encoding an original data packet, the original data packet is data that needs to be sent to the UE, and a quantity of first data packets is greater than a quantity of original data packets; a determining unit, configured to determine that the user equipment UE needs to be handed over from the first network device to a second network device; and a second sending unit, configured to send an original data packet message to the second network device, to instruct the second network device to continue to send a first data packet to the UE according to the original data packet message, where the original data packet message includes all the original data packets and a codebook vector usage message, and the codebook vector usage message is used to indicate codebook vectors used by the second network device when the second network device encodes the original data packets by using the codebook vectors.

In a first possible implementation manner of the eleventh aspect, the present invention provides an implementation apparatus, where that the first data packet is obtained by encoding an original data packet includes: a first obtaining unit being configured to obtain a first codebook, where the first codebook includes a codebook vector, and encode the original data packet according to the codebook vector to obtain the first data packet; and a second obtaining unit being configured to obtain a corresponding identifier of a first data packet corresponding to each codebook vector, where each first data packet includes the corresponding identifier of the first data packet corresponding to each codebook vector, so that the UE determines, according to the corresponding identifier of the first data packet, a codebook vector corresponding to each first data packet, to reconstruct the original data packet. According to a twelfth aspect, the present invention provides an implementation apparatus, including: a first determining unit, configured to determine that UE is handed over from a first network device to the second network device; a first receiving unit, configured to receive an original data packet message, where the original data packet message includes all original data packets and a codebook vector usage message, and the codebook vector usage message is used to indicate codebook vectors used by the second network device when the second network device encodes the original data packets by using the codebook vectors; a first sending unit, configured to send a feedback control message to the UE, where the feedback control message is used to instruct the UE to send indication information of a remaining sending quantity, and the remaining sending quantity k is a quantity of first data packets that the second network device continues to send to the UE; a second receiving unit, configured to receive a feedback message sent by the UE, where the feedback message includes the indication information of the remaining sending quantity; a first encoding unit, configured to obtain at least k third data packets according to the indication information of the remaining sending quantity and the original data packet message; and a second sending unit, configured to send the third data packets to the UE according to the original data packet message.

In a first possible implementation manner of the twelfth aspect, the present invention provides an implementation apparatus, where the first encoding unit further includes: a second obtaining unit, configured to obtain a first codebook, where the first codebook includes a codebook vector; a determining unit, configured to determine used encoding vectors from the first codebook according to the codebook vector usage message, where the original data packet message further includes the codebook vector usage message, and the codebook vector usage message is used to indicate codebook vectors used when the original data packets are encoded; and a second encoding unit, configured to encode the original data packets by using the determined codebook vectors.

In a second possible implementation manner of the twelfth aspect, the present invention provides an implementation apparatus, where the second encoding unit being configured to encode the original data packets further includes: the second encoding unit encoding the original data packets according to the used codebook vectors, the original data packets, and location identifiers of the original data packets: a second determining unit being configured to determine m original data packets, and further configured to determine a location identifier corresponding to each original data packet in the m original data packets, where the location identifier is used to indicate a location of the corresponding original data packet in all the original data packets, m≥k, and a value of k is the remaining sending quantity; and a third encoding unit being configured to separately multiply an $i^{th}$ element in a $j^{th}$ codebook vector by m original data packets whose location identifiers indicate i, to obtain m multiplication results, and further configured to add up all the m obtained multiplication results, to obtain a third data packet corresponding to the $j^{th}$ codebook vector, where the $j^{th}$ codebook vector is one of the used codebook vectors.

In a third possible implementation manner of the twelfth aspect, the present invention provides an implementation apparatus, where the third encoding unit further includes: a third obtaining unit, configured to obtain a corresponding identifier of a third data packet corresponding to each codebook vector; and a setting unit, configured to set the corresponding identifier of the third data packet in the corresponding third data packet, where the corresponding identifier is used to indicate the codebook vector corresponding to the first data packet.

In a fourth possible implementation manner of the twelfth aspect, the present invention provides an implementation apparatus, where a value of m is a quantity of all the original data packets.

In a fifth possible implementation manner of the twelfth aspect, the present invention provides an implementation apparatus, where a value of m is the quantity k of first data packets that are needed to continue to send to the terminal apparatus.

In a sixth possible implementation manner of the twelfth aspect, the present invention provides an implementation apparatus, where the indication information of the remaining sending quantity is: the remaining sending quantity k; or a quantity of data packets that have been correctly received by the UE; or a proportion at which the UE loses a data packet; or a proportion at which the UE correctly receives a data packet.

According to a thirteenth aspect, the present invention provides an implementation apparatus, including: a determining unit, configured to determine that UE is handed over to a second network device, where the second network device is configured to continue to receive a first data packet sent by the UE; a first receiving unit, configured to receive a first data packet sent by a first network device; a second receiving unit, configured to receive a feedback control message sent by the UE, where the feedback control message is used to instruct the second network device to send indication information of a remaining sending quantity, and the remaining sending quantity k is at least greater than or equal to a difference between a quantity of first data packets needed by the second network device to correctly restore all original data packets and a quantity of first data packets correctly received by the UE; a sending unit, configured to send a feedback message to the UE, where the feedback message includes the indication information of the remaining sending quantity; a third receiving unit, configured to receive at least k third data packets sent by the UE; and a first decoding unit, configured to decode the third data packets sent by the UE and the first data packet sent by the first network device, to obtain the original data packets.

In a first possible implementation manner of the thirteenth aspect, the present invention provides an implementation apparatus, where the first decoding unit further includes: an obtaining unit, configured to obtain a first codebook, where the first codebook includes a codebook vector, where the first data packets sent by the UE and the first data packet sent by the first network device include corresponding identifiers, and the corresponding identifiers are used to determine a codebook vector corresponding to each first data packet; and a second decoding unit, configured to perform decoding according to the first data packets sent by the UE, the first data packet sent by the first network device, and the first codebook, to obtain the original data packets.

In a second possible implementation manner of the thirteenth aspect, the present invention provides an implementation apparatus, where the indication information of the remaining sending quantity is: the remaining sending quantity k; or a quantity of data packets that have been correctly received by the first network device; or a proportion at which the first network device loses a data packet; or a proportion at which the first network device correctly receives a data packet.

According to a fourteenth aspect, the present invention provides an implementation apparatus, including: a first sending unit, configured to send at least one first data packet to a first network device, where the first data packet is obtained by encoding an original data packet, the original data packet is data that needs to be sent to a network side, and a quantity of first data packets is greater than a quantity of original data packets; a determining unit, configured to determine that the user equipment UE is handed over from the first network device to a second network device; a second sending unit, configured to send a feedback control message to the second network device, where the feedback control message is used to instruct the second network device to send indication information of a remaining sending quantity k, and the remaining sending quantity k is at least greater than or equal to a difference between a quantity of first data packets needed by the second network device to correctly restore all the original data packets and a quantity of first data packets correctly received by the UE; and a receiving unit, configured to receive a feedback message sent by the second network device, where the feedback message includes the indication information of the remaining sending quantity, where the first sending unit is further configured to send at least k third data packets to the second network device, where the first data packet and the third data packets are used to restore the original data packets.

In a first possible implementation manner of the fourteenth aspect, the present invention provides an implementation apparatus, where that the first data packet is obtained by encoding an original data packet includes: a first obtaining unit being configured to obtain the original data packet, where the original data packet is a message that the UE needs to send to the first network device or the second network device; a second obtaining unit being configured to obtain a first codebook, where the first codebook is used to encode the original data packet; and an encoding unit being configured to encode the original data packet according to the original data packet and the first codebook, to obtain the first data packet.

In a second possible implementation manner of the fourteenth aspect, the present invention provides an implementation apparatus, where the indication information of the remaining sending quantity is: the remaining sending quantity k; or a quantity of data packets that have been correctly received by the first network device; or a proportion at which the first network device loses a data packet; or a proportion at which the first network device correctly receives a data packet.

According to the foregoing solutions, in the method and apparatus provided in the embodiments of the present invention, a manner of interacting and continuing to send and receive a data packet that has not been sent in a network device handover process when a message is sent in a form of a fountain code is implemented, thereby saving a resource.

DESCRIPTION OF EMBODIMENTS

Embodiments of the present invention further give embodiments of apparatuses for implementing steps and methods in the foregoing method embodiments. It should be understood that in all the embodiments of the present invention, a first network device and a second network device may each be a base station, the first network device may be a source base station S-eNB, and the second network device may be a target base station T-eNB. In addition, the present invention claims protection of methods, corresponding claims, system embodiments, and combination, division, and logical changes of methods and steps in corresponding claims; and the present invention claims protection of combination, division, and logical changes of modules, units, and physical apparatuses in apparatus embodiments and corresponding claims.

Figure 1:
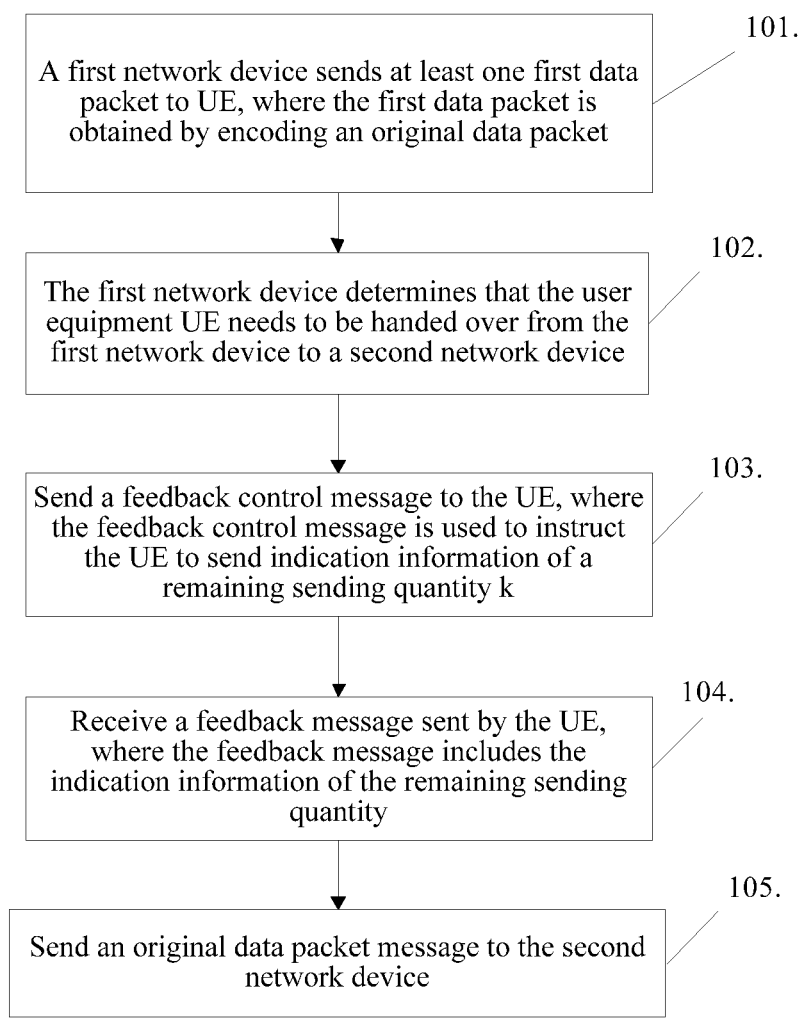
FIG. 1 is a flowchart of an embodiment of a method for data transmission according to the present invention.

FIG. 1 shows an embodiment of a method for data transmission according to the present invention. The method is a method for data transmission by a network side device during a handover. The method may be run in a network including a first network device. In a process in which the first network device sends data in a form of a fountain code to UE, the UE is handed over from the first network side device to another network side device. The method for data transmission includes:

Step 101: The first network device sends at least one first data packet to the UE, where the first data packet is obtained by encoding an original data packet, the original data packet is data that needs to be sent to the UE, and a quantity of first data packets is greater than a quantity of original data packets.

In an embodiment of the present invention, a specific step of that the first data packet is obtained by encoding an original data packet may include:

obtaining a first codebook, where the first codebook includes a codebook vector, and encoding the original data packet according to the codebook vector to obtain the first data packet. It should be understood that, a method for obtaining the first codebook is not specifically limited in the present invention. Optionally, the first codebook may be stored in the first network device, or determined by the first network device according to a specific network status, or the first network device receives a message that is sent by another device and that includes the first codebook, so as to obtain the first codebook.

In an embodiment of the present invention, a specific encoding manner may be performing point multiplication for an original data packet by using a codebook vector, to obtain a first data packet. For ease of description and understanding, an available codebook is $A_{L\times n}$, an encoding matrix consisting of M codebook vectors selected from L codebooks in $A_{L\times n}$ is $A_{M\times n}$, and an original data packet forms a vector $\alpha$, where A is an M×n matrix, and $\alpha$ is an n-dimensional vector. If indicated in a form of a matrix, a manner for point multiplication of each codebook and the vector $\alpha$ formed by the original data packet may be indicated as:

$$\beta_{M\times 1} = A_{M\times n}\alpha_{n\times 1}$$

where each element of an obtained vector $\beta_{M\times 1}$ is a first data packet. M>n.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

Further, the first network device obtains a corresponding identifier of a first data packet corresponding to each codebook vector, where each first data packet includes a respective corresponding identifier. In the present invention, the corresponding identifier of the first data packet indicates a codebook vector for the first data packet during encoding. For example, the corresponding identifier of the first data packet may be information about a location of the codebook vector in the first codebook when encoding processing is performed for the first data packet. The UE determines, according to the corresponding identifier of the first data packet, a codebook vector corresponding to each first data packet, to reconstruct the original data packet. As in the foregoing example, an $i^{th}$ element in the vector $\beta_{M \times 1}$ corresponds to an $i^{th}$ first data packet, which is obtained through point multiplication of an $i^{th}$ row in A and $\alpha$ of the original data packet. Correspondingly, the $i^{th}$ first data packet corresponds to a codebook vector in the $i^{th}$ row in A.

Optionally, i is used as the corresponding identifier, and set in each first data packet, and the first data packet is sent to the UE.

It should be understood that, the present invention is not limited to using i as the corresponding identifier and setting i in the first data packet, and an identifier in another form may be used, or another manner may be used so that the UE obtains the codebook vector corresponding to each first data packet.

Step 102: The first network device determines that the user equipment UE needs to be handed over from the first network device to a second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

Step 103: Send a feedback control message to the UE, where the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE.

Step 104: Receive a feedback message sent by the UE, where the feedback message includes the indication information of the remaining sending quantity.

In the handover process, the first network device needs to notify the second network device of a message that is in downlink communication, to continue to send a first data packet that has not been sent by the first network device, so that the UE reconstructs an original signal (original data packets) according to first data packets sent by the first network device and the second network device. The first network device sends a feedback control message to the UE, so that the UE feeds back indication information of a remaining sending quantity k. In an embodiment of the present invention, the indication information of the remaining sending quantity may be in, but not limited to, the following forms:

the remaining sending quantity k; or a quantity of data packets that have been correctly received by the UE; or a proportion at which the UE loses a data packet; or a proportion at which the UE correctly receives a data packet.

It should be understood that, the present invention does not limit the indication information of the remaining sending quantity only to the several forms above, the indication information of the remaining sending quantity is aimed at indicating a quantity of first data packets that the second network device continues to send to the UE, and indication information of the remaining sending quantity that achieves the aim all belongs to the protection scope of the present invention.

Step 105: Send an original data packet message to the second network device, to instruct the second network device to continue to send a first data packet to the UE according to the original data packet message, where the original data packet message includes the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets.

It should be understood that, a specific form of the location identifier of the second data packet is not limited in the present invention. Optionally, the location identifier is an index that is set in the second data packet.

For the sending an original data packet message to the second network device in step 105, the present invention further gives two corresponding different implementation manners:

Implementation Manner 1:

The second data packet is all the original data packets, the original data packet message further includes a codebook vector usage message, and the codebook vector usage message is used to indicate codebook vectors used by the second network device when the second network device encodes the original data packets by using the first codebook, so that the second network device obtains the first data packet that the second network device needs to continue to send to the UE, where each original data packet includes a location identifier, so that the second network device determines, according to the location identifier, a location of each original data packet during encoding.

In this implementation manner, the first network device sends all original data packet messages to the second network device, so that the second network device continues to encode the original data packets according to the original data packets and the used codebook vectors.

Implementation Manner 2:

A quantity of second data packets is the remaining sending quantity k, the original data packet message further includes a codebook vector usage message, and the codebook vector usage message is used to indicate codebook vectors used by the second network device when the second network device encodes the original data packets by using the first codebook, where each original data packet includes a location identifier, so that the second network device determines, according to the location identifier, a location of each original data packet during encoding.

In this implementation manner, a quantity of second data packets is the remaining sending quantity k, and after the k second data packets are sent to the second network device, the second network device may perform encoding according to the second data packets to obtain first data packets, so that the UE performs decoding according to the first data packet sent by the first network device and the second data packets sent by the second network device, to obtain the original data packets.

In this embodiment, a specific manner when a network device handover occurs when a first network device sends data in a form of a fountain code in a downlink data sending process is described, ensuring that when a fountain code encoding manner is used, no data is lost in a cell handover process, reducing data packet retransmission, improving handover efficiency, and resolving a problem that fountain code handover cannot be implemented in a network in a conventional handover form.

Figure 2:
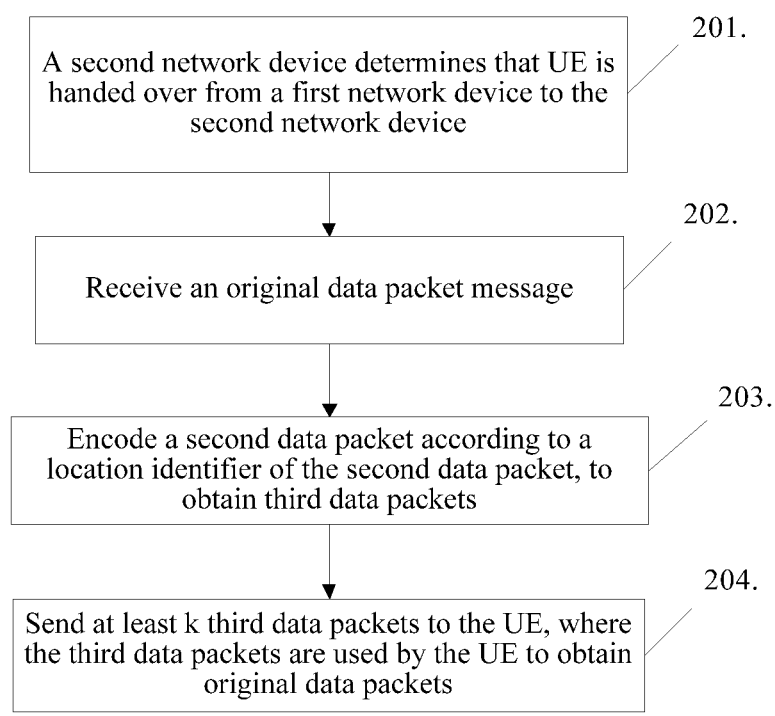
FIG. 2 is a flowchart of another embodiment of a method for data transmission according to the present invention.

FIG. 2 shows a schematic diagram of another embodiment of a method for data transmission according to the present invention. The method is a method for data transmission by a network side device during a handover, and a method for data transmission by a network device when UE is handed over from another network device to the network device in a process of sending data in a form of a fountain code to the UE is specifically described. The method includes:

Step 201: A second network device determines that the UE is handed over from a first network device to the second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

Step 202: Receive an original data packet message, where the original data packet message includes indication information of a remaining sending quantity k, a second data packet, and a location identifier of the second data packet, the second data packet is m data packets selected from original data packets, m≥k, the remaining sending quantity k is at least greater than or equal to a difference between a quantity of first data packets needed by the UE to correctly restore all the original data packets and a quantity of first data packets correctly received by the UE, and the location identifier of the second data packet is identifiers of locations of the selected data packets in the original data packets.

In the handover process, the second network device needs to obtain a message that is in downlink communication of the first network device, to send a third data packet, so that the UE reconstructs an original signal (original data packets) according to third data packets sent by the first network device and the second network device. The first network device sends a feedback control message to the UE, so that the UE feeds back indication information of a remaining sending quantity k. In an embodiment of the present invention, the indication information of the remaining sending quantity may be in, but not limited to, the following forms:

the remaining sending quantity k; or a quantity of data packets that have been correctly received by the UE; or a proportion at which the UE loses a data packet; or a proportion at which the UE correctly receives a data packet.

Step 203: Encode the second data packet according to the location identifier of the second data packet, to obtain third data packets.

In an embodiment of the present invention, before the second data packet is encoded, a first codebook is obtained, where the first codebook includes a codebook vector, and the first codebook is used to encode the second data packet.

It should be understood that, a method for obtaining the first codebook is not specifically limited in the present invention. Optionally, the first codebook may be stored in the first network device, or determined by the first network device according to a specific network status, or the first network device receives a message that is sent by another device and that includes the first codebook, so as to obtain the first codebook.

Optionally, the original data packet message further includes a codebook vector usage message, the codebook vector usage message is used to indicate codebook vectors available when the original data packets are encoded, and available encoding vectors are determined from the first codebook, to encode the original data packets.

Each original data packet further includes a location identifier, and a location of each original data packet during encoding by the first network device is determined according to the location identifier;

codebook vectors used by the second network device when the second network device encodes the second data packet are determined according to the codebook vector usage message; and the original data packets are encoded according to the used codebook vectors and the location identifiers:

an $i^{th}$ element in a $j^{th}$ codebook vector is separately multiplied by m original data packets whose location identifiers indicate i, to obtain m multiplication results, and the m obtained multiplication results are added up, to obtain a third data packet corresponding to the $j^{th}$ codebook vector, where the $j^{th}$ codebook vector is one of the used codebook vectors.

Each codebook vector and a corresponding identifier of a first data packet are obtained, and set in the corresponding first data packet. It should be understood that, in step 202 and step 203, the present invention does not limit the original data packet message to including only the content above. The second data packet is m data packets selected from the original data packets, and the present invention gives two possible examples:

Implementation Manner 1:

A value of m is a quantity of all the original data packets for encoding.

In this case, the encoding method may be the same as that in the embodiment given in step 101, and is equivalent to a form of step 203, that is, all the original data packets are encoded, to obtain third data packets:

$$\beta_{P\times 1}=A_{P\times n}\alpha_{n\times 1}$$

where $A_{P\times n}$ consists of used codebook vectors, P third data packets are obtained, and P≥k. It should be understood that, in this implementation manner, the third data packets are formed by the original data packets, and have an encoding manner consistent with that of the first data packet, and a difference from the first data packet is: Sending sources are different and each used codebook vector is different from a codebook vector used for the first data packet. Subsequent decoding and other embodiments corresponding to this implementation manner all may conform to this difference, and details are not described in the present invention again.

Or

Implementation Manner 2:

A value of m is the quantity k of first data packets that are needed to continue to send to the UE.

In this case, for ease of description and understanding, a matrix form may also be used:

$$\beta'_{Q \times 1} = A_{Q \times n} \alpha_{k\text{-sparse}}$$

where $A_{Q \times n}$ consists of used codebook vectors, $\alpha_{k\text{-Sparse}}$ is an n-dimensional vector, an $i^{th}$ element of $\alpha_{k\text{-sparse}}$ is an original data packet whose location identifier indicates i, other locations are all 0, and Q≥k.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

After the original data packets are encoded according to the two implementation manners, third data packets are obtained, and sent to the UE, so that the UE obtains the original data packets. It should be understood that, according to the two different implementation manners, the UE has different decoding manners. When the technical solution of the present invention is implemented, the second network device may send a message, to notify the UE of an encoding manner for the third data packets included in the sent original data packet message. In an embodiment, this embodiment of the present invention is implemented in a preset manner, and the preset manner is an encoding manner for original data packets that is agreed by a network device and the UE device.

Step 204: Send at least k third data packets to the UE. The third data packets are used by the UE to obtain the original data packets.

In this embodiment, a specific handover manner in a case in which in a downlink data sending process, when a second network device determines that a network device handover occurs, the second network device receives a data packet that is sent by a first network device to UE is described, and in this embodiment, an encoding manner for a third data packet that the second network device needs to continue to send to the UE and related steps are described, ensuring that when a fountain code encoding manner is used, no data is lost in a cell handover process, reducing data packet retransmission, improving handover efficiency, and resolving a problem that fountain code handover cannot be implemented in a network in a conventional handover form.

Figure 3:
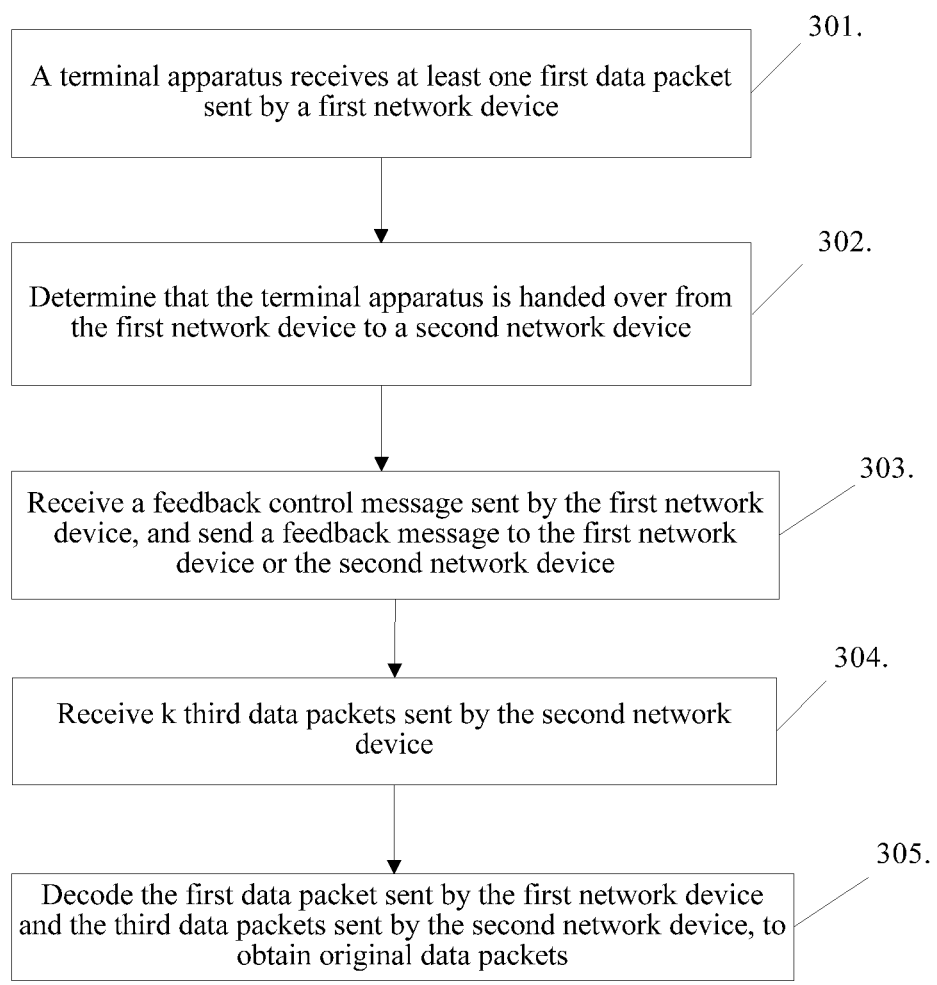
FIG. 3 is a flowchart of another embodiment of a method for data transmission according to the present invention.

FIG. 3 shows another embodiment of a method for data transmission according to the present invention. The method is a method for data transmission by a terminal device during a handover, and a method of: when a network device handover occurs, receiving a first data packet sent by a first network device, receiving a third data packet sent by a second network device after the handover to the second network device, and performing decoding to obtain original data packets is specifically described. The method includes:

Step 301: The terminal apparatus receives at least one first data packet sent by the first network device, where the first data packet is obtained by encoding an original data packet, and the at least one first data packet is used to perform decoding to obtain the original data packet.

Step 302: Determine that the terminal apparatus is handed over from the first network device to the second network device.

Step 303: Receive a feedback control message sent by the first network device, where the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE; and send a feedback message to the first network device or the second network device, where the feedback message includes the indication information of the remaining sending quantity.

In an embodiment of the present invention, in step 303, the indication information of the remaining sending quantity is:

the remaining sending quantity k; or a quantity of data packets that have been correctly received by the UE; or a proportion at which the UE loses a data packet; or a proportion at which the UE correctly receives a data packet.

Step 304: Receive k third data packets sent by the second network device, where the third data packets sent by the second network device are used to perform decoding to obtain original data packets.

Step 305: Decode the first data packet sent by the first network device and the third data packets sent by the second network device, to obtain the original data packets.

In an embodiment of the present invention, a decoding manner in step 305 may be specifically:

obtaining a first codebook, where the first codebook includes a codebook vector;

obtaining a corresponding identifier included in the first data packet sent by the first network device, where the corresponding identifier indicates a codebook vector corresponding to each first data packet;

obtaining corresponding identifiers included in the third data packets sent by the second network device, where the corresponding identifiers indicate a codebook vector corresponding to each third data packet; and decoding, according to the first codebook, the corresponding identifier included in the first data packet sent by the first network device, and the corresponding identifiers included in the third data packets sent by the second network device, the first data packet sent by the first network device and the third data packets sent by the second network device, to obtain the original data packets.

Corresponding to the two implementation manners of steps 202 and 203 in the embodiment shown in FIG. 2, this embodiment gives two different decoding manners, where the decoding manners are determined according to characteristics of the third data packets sent by the second network device:

Decoding Manner 1:

If a quantity of first data packets that need to be sent to the UE is S, and the remaining sending quantity is k, a quantity of first data packets that have been sent by the first network device before the handover is T=S−k. When an original data packet message sent from the first network device to the second network device includes m original data packets, where a value of m is a quantity of all original data packets for encoding, first data packets $\beta_{11}, \beta_{12}, \beta_{13}, \ldots$, and $\beta_{1T}$ sent by the first network device and received on the UE side and third data packets $\beta_{21}, \beta_{22}, \beta_{23}, \ldots$, and $\beta_{2k}$ sent by the second network device and received on the UE side jointly form an equation, that is:

$$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix} = A_{decode}\alpha.$$

In obtained $\alpha$, each element is an original data packet. It should be understood that, S is at least greater than a length of the original data packets, so as to ensure that the original data packets can be obtained by decoding according to a value of S and the matrix $A_{decode}$.

Decoding Manner 2:

If a quantity of first data packets that need to be sent to the UE is S, and the remaining sending quantity is k, a quantity of first data packets that have been sent by the first network device before the handover is T=S−k. When an original data packet message sent from the first network device to the second network device includes m original data packets, where a value of m is the quantity k of first data packets that are needed to continue to send to the UE, first data packets $\gamma_{11}, \gamma_{12}, \gamma_{13}, \ldots$, and $\gamma_{1P}$ sent by the first network device and received on the UE side and second network device sent by third data packets $\gamma_{21}, \gamma_{22}, \gamma_{23}, \ldots$, and $\gamma_{2Q}$ sent by the second network device and received on the UE side are decoded:

$$\begin{bmatrix} \gamma_{21} \\ \gamma_{22} \\ \vdots \\ \gamma_{2Q} \end{bmatrix} = A_{Q\times n}\alpha_{k\text{-sparse}} \text{ and } \begin{bmatrix} \gamma_{11} \\ \gamma_{12} \\ \vdots \\ \gamma_{1P} \end{bmatrix} = A_{P\times n}\alpha_{n\times 1}.$$

In an embodiment, a quantity of original data packets included in obtained $\alpha_{k\text{-sparse}}$ is k, and other locations are 0. Then all the original data packets are obtained by decoding according to the original data packets determined by $\alpha_{k\text{-sparse}}$ and an equation $$\begin{bmatrix} \gamma_{11} \\ \gamma_{12} \\ \vdots \\ \gamma_{1P} \end{bmatrix} = A_{P\times n}\alpha_{n\times 1}.$$

It should be understood that, a specific decoding manner in the decoding manner 2 is not limited to the foregoing embodiment, and the present invention does not limit another specific decoding manner.

It should be understood that, the present invention is not limited to the two decoding methods in the decoding manner 1 and the decoding manner 2, and during specific implementation, each matrix in the example may be an array, a sequence, or binary code stored in the UE apparatus, and a decoding operation may be a mathematical operation in another form.

In this embodiment, a specific handover manner in a case in which in a downlink data sending process, when UE determines that a network device handover occurs, the UE receives a data packet that is sent by a first network device is described, and in this embodiment, a manner for receiving and decoding, by the UE, a first data packet sent by the first network device and a third data packet sent by a second network device and related steps are described, ensuring that when a fountain code encoding manner is used, no data is lost in a cell handover process, reducing data packet retransmission, improving handover efficiency, and resolving a problem that fountain code handover cannot be implemented in a network in a conventional handover form.

Figure 4:
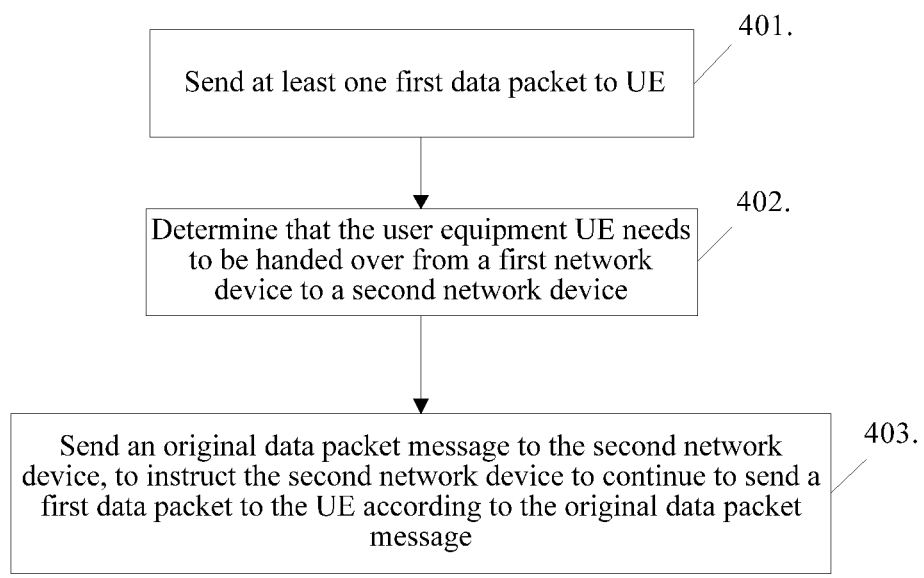
FIG. 4 is a flowchart of another embodiment of a method for data transmission according to the present invention.

FIG. 4 shows a schematic diagram of another embodiment of a method for data transmission according to the present invention. The method is a method for data transmission by a first network device during a handover, and a method for data transmission by the first network device when UE is handed over from the first network device to a second network device in a process of sending data in a form of a fountain code to the UE is specifically described. The method includes:

Step 401: The first network device sends at least one first data packet to the UE, where the first data packet is obtained by encoding an original data packet, the original data packet is data that needs to be sent to the UE, and a quantity of first data packets is greater than a quantity of original data packets.

In an embodiment of the present invention, that the first data packet is obtained by encoding an original data packet includes: obtaining, by the first network device, a first codebook, where the first codebook includes a codebook vector, and encoding the original data packet according to the codebook vector to obtain the first data packet.

It should be understood that, a method for obtaining the first codebook is not specifically limited in the present invention. Optionally, the first codebook may be stored in the first network device, or determined by the first network device according to a specific network status, or the first network device receives a message that is sent by another device and that includes the first codebook, so as to obtain the first codebook.

In an embodiment of the present invention, a specific encoding manner may be performing point multiplication for an original data packet by using a codebook vector, to obtain a first data packet. For ease of description and understanding, an available codebook is $A_{L\times n}$, an encoding matrix consisting of M codebook vectors selected from L codebooks in $A_{L\times n}$ is $A_{M\times n}$, and an original data packet forms a vector $\alpha$, where A is an M×n matrix, and $\alpha$ is an n-dimensional vector. If indicated in a form of a matrix, a manner for point multiplication of each codebook and the vector $\alpha$ formed by the original data packet may be indicated as:

$$\beta_{M\times 1} = A_{M\times n}\alpha_{n\times 1}$$

where each element of an obtained vector $\beta_{M\times 1}$ is a first data packet. M>n.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

Further, the first network device obtains a corresponding identifier of a first data packet corresponding to each codebook vector, where each first data packet includes a respective corresponding identifier, so that the UE determines, according to the corresponding identifier of the first data packet, a codebook vector corresponding to each first data packet, to reconstruct the original data packet. As in the foregoing example, an $i^{th}$ element in the vector $\beta_{M \times 1}$ corresponds to an $i^{th}$ first data packet, which is obtained through point multiplication of an $i^{th}$ row in A and $\alpha$ of the original data packet. Correspondingly, the $i^{th}$ first data packet corresponds to a codebook vector in the $i^{th}$ row in A.

Optionally, i is used as the corresponding identifier, and set in each first data packet, and the first data packet is sent to the UE.

It should be understood that, the present invention is not limited to using i as the corresponding identifier and setting i in the first data packet, and an identifier in another form may be used, or another manner may be used so that the UE obtains the codebook vector corresponding to each first data packet.

Step 402: The first network device determines that the user equipment UE needs to be handed over from the first network device to the second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

Step 403: Send an original data packet message to the second network device, to instruct the second network device to continue to send a first data packet to the UE according to the original data packet message, where the original data packet message includes all the original data packets and a codebook vector usage message, and the codebook vector usage message is used to indicate codebook vectors used by the second network device when the second network device encodes the original data packets by using the codebook vectors.

In an embodiment, the original data packet message is all the original data packet messages.

In this embodiment, it is described that in a downlink data sending process, when a first network device determines that a network device handover occurs, the first network device sends an original data packet to a second network device, so that the second network device performs encoding according to the original data packet to obtain a first data packet. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 5:
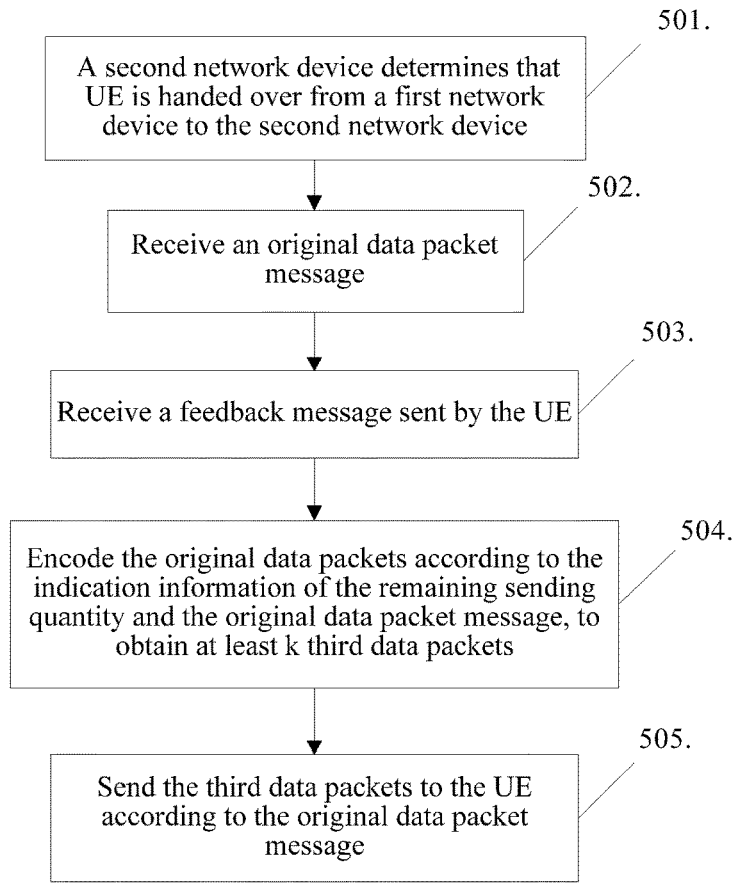
FIG. 5 is a flowchart of another embodiment of a method for data transmission according to the present invention.

FIG. 5 shows another embodiment of a method for data transmission according to the present invention. The method is a method for data transmission by a second network device during a handover, and a method for data transmission by the network device when UE is handed over from another network device to the network device in a process of sending data in a form of a fountain code to the UE is specifically described. The method includes:

Step 501: The second network device determines that the UE is handed over from a first network device to the second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

Step 502: Receive an original data packet message, where the original data packet message includes all the original data packets and a codebook vector usage message, and the codebook vector usage message is used to indicate codebook vectors used by the second network device when the second network device encodes the original data packets by using the codebook vectors.

Step 503: Send a feedback control message to the UE, where the feedback control message is used to instruct the UE to send indication information of a remaining sending quantity, and the remaining sending quantity k is a quantity of first data packets that the second network device continues to send to the UE.

Step 504: Receive a feedback message sent by the UE, where the feedback message includes the indication information of the remaining sending quantity.

The indication information of the remaining sending quantity is:

the remaining sending quantity k; or a quantity of data packets that have been correctly received by the UE; or a proportion at which the UE loses a data packet; or a proportion at which the UE correctly receives a data packet.

Step 505: Encode the original data packets according to the indication information of the remaining sending quantity and the original data packet message, to obtain at least k third data packets.

In an embodiment of the present invention, a specific step of encoding the original data packets to obtain third data packets may include:

obtaining a first codebook, where the first codebook includes a codebook vector, and the first codebook is used to encode the original data packets; and encoding the original data packets according to codebook vectors to obtain the third data packets.

It should be understood that, a method for obtaining the first codebook is not specifically limited in the present invention. Optionally, the first codebook may be stored in the first network device, or determined by the first network device according to a specific network status, or the first network device receives a message that is sent by another device and that includes the first codebook, so as to obtain the first codebook.

Optionally, the original data packet message further includes a codebook vector usage message, the codebook vector usage message is used to indicate codebook vectors used when the original data packets are encoded, used encoding vectors are determined from the first codebook according to the codebook vector usage message, and the original data packets are encoded by using the determined codebook vectors.

Each original data packet further includes a location identifier, and a location of each original data packet during encoding by the first network device is determined according to the location identifier; and the original data packets are encoded according to the used codebook vectors, the original data packets, and location identifiers:

m original data packets are determined, and a location identifier corresponding to each original data packet in the m original data packets is determined, where the location identifier is used to indicate a location of the corresponding original data packet in all the original data packets, m≥k, and a value of k is the remaining sending quantity; and an $i^{th}$ element in a $j^{th}$ codebook vector is separately multiplied by m original data packets whose location identifiers indicate i, to obtain m multiplication results, and all the m obtained multiplication results are added up, to obtain a third data packet corresponding to the $j^{th}$ codebook vector, where the $j^{th}$ codebook vector is one of the used codebook vectors.

In an embodiment of the present invention, each codebook vector and a corresponding identifier of a third data packet are obtained, and set in the corresponding third data packet, so that the UE determines, according to the corresponding identifier of the third data packet, a codebook vector corresponding to each third data packet, to reconstruct an original data packet.

It should be understood that, a specific encoding manner in step 504 is not limited in the present invention, and another manner may be used to encode data. Correspondingly, the UE should have a corresponding method in a decoding process to perform decoding to obtain an original data packet. Specifically, the present invention gives two possible examples, and reference may be made to the method of step 203:

Implementation Manner 1:

A value of m is a quantity of all the original data packets. In this case, the encoding method may be the same as that in the embodiment given in step 101, that is, all the original data packets are encoded, to obtain third data packets:

$$\beta_{P \times 1} = A_{P \times n} \alpha_{n \times 1}$$

where $A_{P \times n}$ consists of used codebook vectors, P third data packets are obtained, and P≥k. Or Implementation Manner 2:

A value of m is the quantity k of first data packets that are needed to continue to send to the terminal apparatus.

In this case, for ease of description and understanding, a matrix form may also be used:

$$\beta'_{Q \times 1} = A_{Q \times n} \alpha_{k\text{-}sparse}$$

where $A_{Q \times n}$ consists of used codebook vectors, $\alpha_{k\text{-}sparse}$ is an n-dimensional vector, an $i^{th}$ element of $\alpha_{k\text{-}sparse}$ is an original data packet whose location identifier indicates i, other locations are all 0, and Q≥k.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

After the original data packets are encoded according to the two implementation manners, third data packets are obtained, and sent to the UE, so that the UE obtains the original data packets. It should be understood that, according to the two different implementation manners, the UE has different decoding manners. When the technical solution of the present invention is implemented, the second network device may send a message, to notify the UE of an encoding manner for the third data packets included in the sent original data packet message. In an embodiment, this embodiment of the present invention is implemented in a preset manner, and the preset manner is an encoding manner for original data packets that is agreed by a network device and the UE device.

Further, a corresponding identifier of a third data packet corresponding to each codebook vector is obtained, and set in the corresponding third data packet, so that the UE determines, according to the corresponding identifier of the third data packet, a codebook vector corresponding to each third data packet, to reconstruct an original data packet.

As in the foregoing example, an $i^{th}$ element in the vector $\beta_{M \times 1}$ corresponds to an $i^{th}$ $i^{th}$ third data packet, which is obtained through point multiplication of an $i^{th}$ row in A and α of the original data packet. Correspondingly, the $i^{th}$ third data packet corresponds to a codebook vector in the $i^{th}$ row in A.

Optionally, i is used as the corresponding identifier, and set in each third data packet, and the third data packet is sent to the UE.

It should be understood that, the present invention is not limited to using i as the corresponding identifier and setting i in the third data packet, and an identifier in another form may be used, or another manner may be used so that the UE obtains the codebook vector corresponding to each third data packet.

Step 506: Send the third data packets to the UE according to the original data packet message.

In this embodiment, a method in which in a downlink data sending process, when a second network device determines that a network device handover occurs, the second network device performs encoding according to a quantity of third data packets that the second network device needs to continue to send to UE, and sends the third data packets to the UE is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 6:
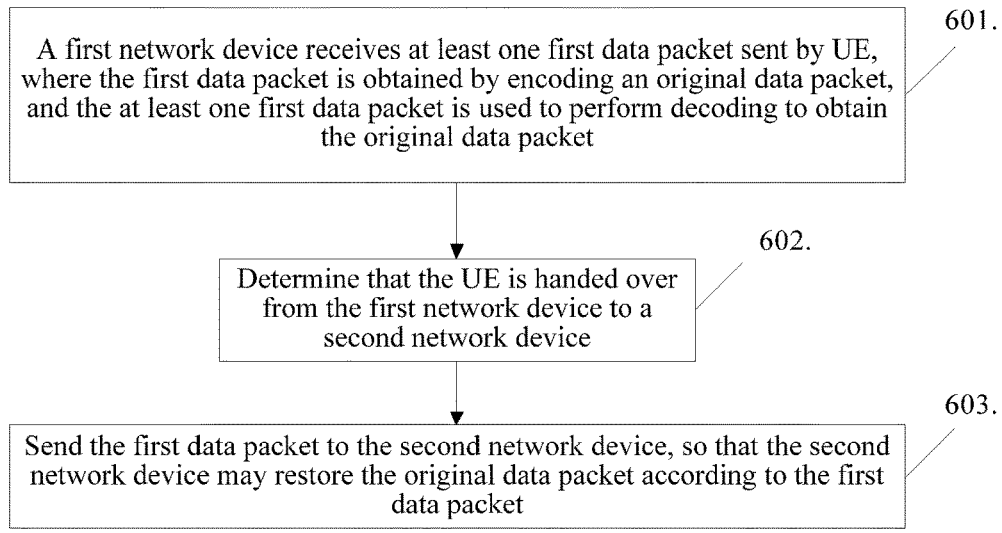
FIG. 6 is a flowchart of another embodiment of a method for data transmission according to the present invention.

FIG. 6 shows an embodiment of a method for data transmission according to the present invention. The method is a method for data transmission by a first network device during a handover. The method may be run in a network including the first network device. In a process in which the first network device receives data in a form of a fountain code that is sent by UE, the UE is handed over from the first network side device to another network side device. The method for data transmission includes:

Step 601: The first network device receives at least one first data packet sent by the UE, where the first data packet is obtained by encoding an original data packet, and the at least one first data packet is used to perform decoding to obtain the original data packet.

Step 602: Determine that the UE is handed over from the first network device to a second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

Step 603: Send the first data packet to the second network device, so that the second network device may restore the original data packet according to the first data packet.

Optionally, the first data packet further includes a location identifier corresponding to the first data packet, and the location identifier is used to perform decoding to restore the original data packet.

In this embodiment, a process in which in an uplink data sending process, when a first network device determines that a network device handover occurs, the first network device sends a received first data packet to a second network device is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 7:
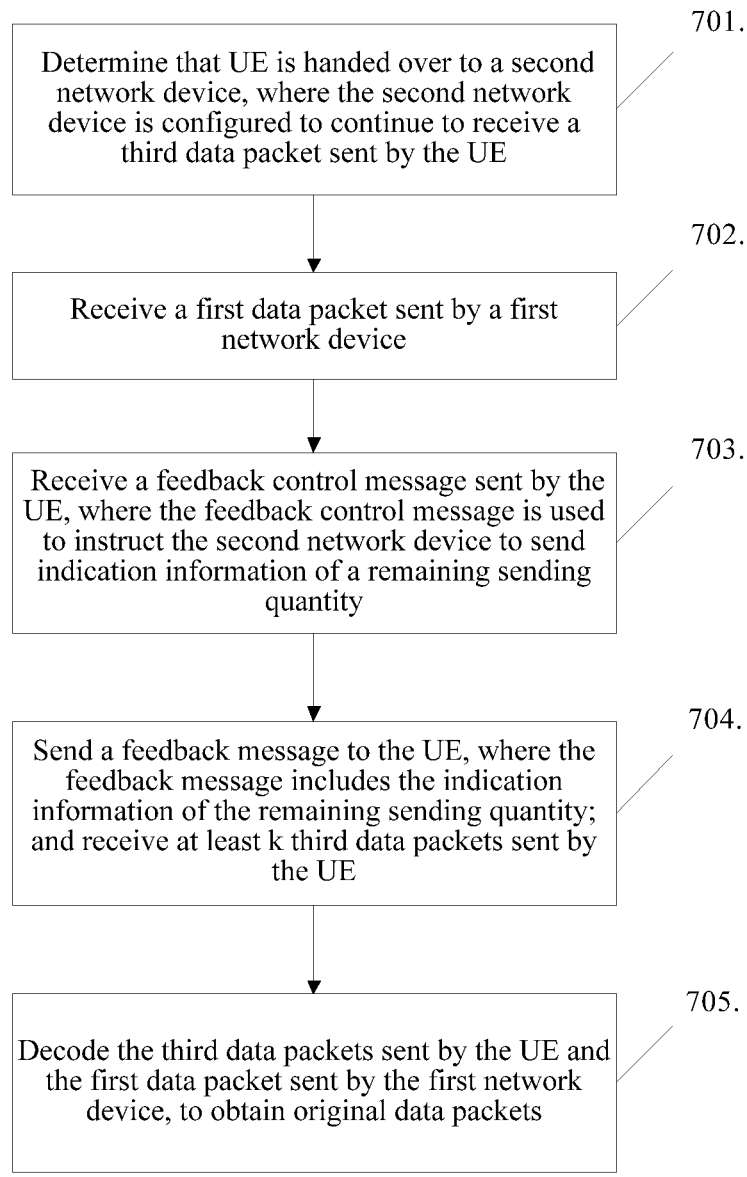
FIG. 7 is a flowchart of another embodiment of a method for data transmission according to the present invention.

FIG. 7 shows an embodiment of a method for data transmission according to the present invention. The method is a method for data transmission by a second network device during a handover. The method may be run in a network including the second network device. In a process in which the second network device receives data in a form of a fountain code that is sent by UE, the UE is handed over from another device to the second network device. The method for data transmission includes:

Step 701: Determine that the UE is handed over to the second network device, where the second network device is configured to continue to receive a third data packet sent by the UE.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

Step 702: Receive a first data packet sent by a first network device.

Step 703: Receive a feedback control message sent by the UE, where the feedback control message is used to instruct the second network device to send indication information of a remaining sending quantity, and the remaining sending quantity k is at least greater than or equal to a difference between a quantity of first data packets needed by the second network device to correctly restore all original data packets and a quantity of first data packets correctly received by the UE. Optionally, the indication information of the remaining sending quantity is:

the remaining sending quantity k; or
a quantity of data packets that have been correctly received by the first network device; or
a proportion at which the first network device loses a data packet; or
a proportion at which the first network device correctly receives a data packet.

Step 704: Send a feedback message to the UE, where the feedback message includes the indication information of the remaining sending quantity; and receive at least k third data packets sent by the UE.

Step 705: Decode the third data packets sent by the UE and the first data packet sent by the first network device, to obtain the original data packets.

In an embodiment of the present invention, a first codebook is obtained, where the first codebook includes a codebook vector;

the third data packets sent by the UE and the first data packet sent by the first network device include respective corresponding identifiers, and the corresponding identifiers are used to determine a codebook vector respectively corresponding to each first data packet or each third data packet; and decoding is performed according to the third data packets sent by the UE, the first data packet sent by the first network device, and the first codebook, to obtain the original data packets. The original data packets are a message or data that the UE needs to send to a network side.

If a quantity of first data packets that need to be sent to the second network device is S, and the remaining sending quantity is k, a quantity of first data packets that have been received by the first network device before the handover is T=S−k. First data packets $\beta_{11}, \beta_{12}, \beta_{13}, \ldots,$ and $\beta_{1T}$ sent by the first network side device to the second network side device and third data packets $\beta_{21}, \beta_{22}, \beta_{23}, \ldots,$ and $\beta_{2k}$ sent by the UE to the second network side device jointly form an equation, that is:

$$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix} = A_{decode} \alpha.$$

In obtained $\alpha$, each element is an original data packet. It should be understood that, S is at least greater than a length of the original data packets, so as to ensure that the original data packets can be obtained by decoding according to a value of S and the matrix $A_{decode}$. $A_{decode}$ consists of codebook vectors, and each codebook column vector corresponds to one element in $$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix}$$

according to an encoding order.

It should be understood that, during specific implementation, each matrix in the example may be an array, a sequence, or binary code stored in the UE apparatus, and a decoding operation may be a mathematical operation in another form.

In this embodiment, a process in which in an uplink data sending process, when a second network device determines that a network device handover occurs, the second network device receives a first data packet and a third data packet is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 8:
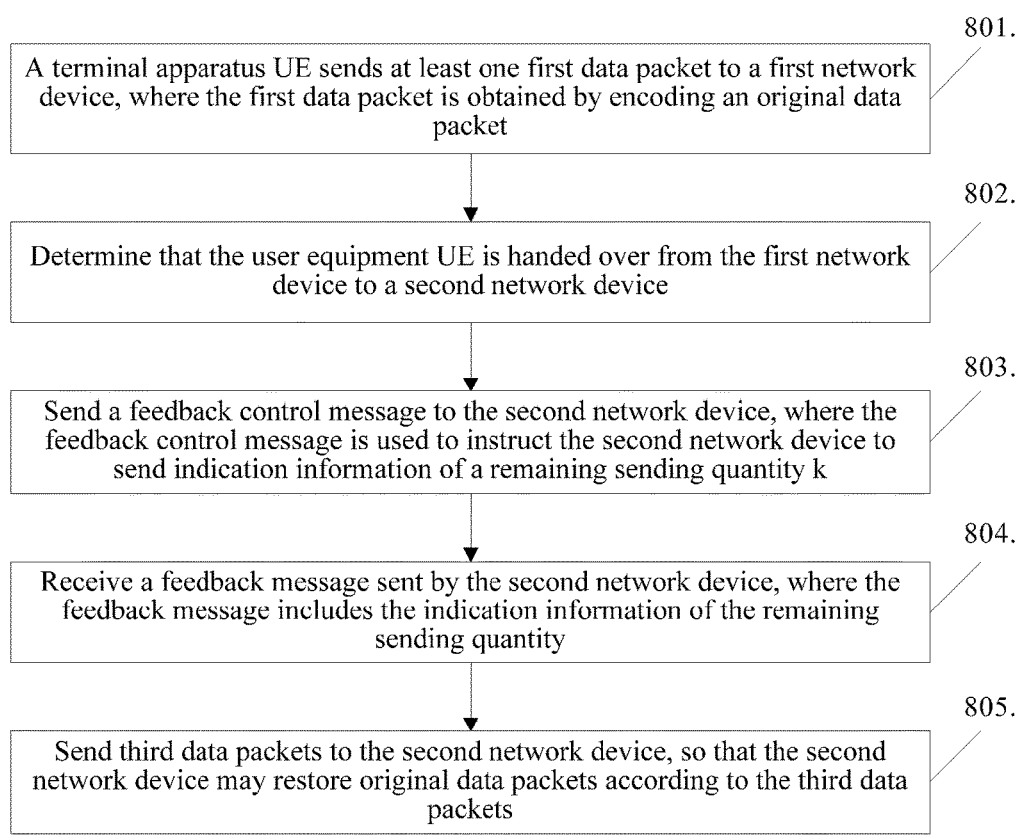
FIG. 8 is a flowchart of another embodiment of a method for data transmission according to the present invention.

FIG. 8 shows an embodiment of a method for data transmission according to the present invention. The method is a method for data transmission by a terminal device during a handover, and a method of: when a network device handover occurs, sending a first data packet to a first network device, and sending a third data packet to a second network device after the handover to the second network device is specifically described. The method specifically includes:

Step 801: The terminal apparatus UE sends at least one first data packet to the first network device, where the first data packet is obtained by encoding an original data packet, the original data packet is data that needs to be sent to a network side, and a quantity of first data packets is greater than a quantity of original data packets.

Optionally, that the first data packet is obtained by encoding an original data packet includes: obtaining the original data packet, where the original data packet is a message that the UE needs to send to the first network device or the second network device;

obtaining a first codebook, where the first codebook is used to encode the original data packet; and encoding the original data packet according to the original data packet and the first codebook, to obtain the first data packet.

Step 802: Determine that the user equipment UE is handed over from the first network device to the second network device.

Step 803: Send a feedback control message to the second network device, where the feedback control message is used to instruct the second network device to send indication information of a remaining sending quantity k, and the remaining sending quantity k is at least greater than or equal to a difference between a quantity of first data packets needed by the second network device to correctly restore all the original data packets and a quantity of first data packets correctly received by the UE.

Step 804: Receive a feedback message sent by the second network device, where the feedback message includes the indication information of the remaining sending quantity.

Step 805: Send third data packets to the second network device, so that the second network device may restore original data packets according to the third data packets.

In this embodiment, a method in which in an uplink data sending process, when a terminal determines that a network device handover occurs, the terminal receives a first data packet and a third data packet is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form. It should be understood that, before step 801, the original data packet is encoded, to obtain the first data packet. Optionally, the third data packet may be a first data packet that has not been sent to the first network device. An encoding manner in this embodiment may be executed in a fountain code encoding manner, and details are not described herein.

Figure 9:
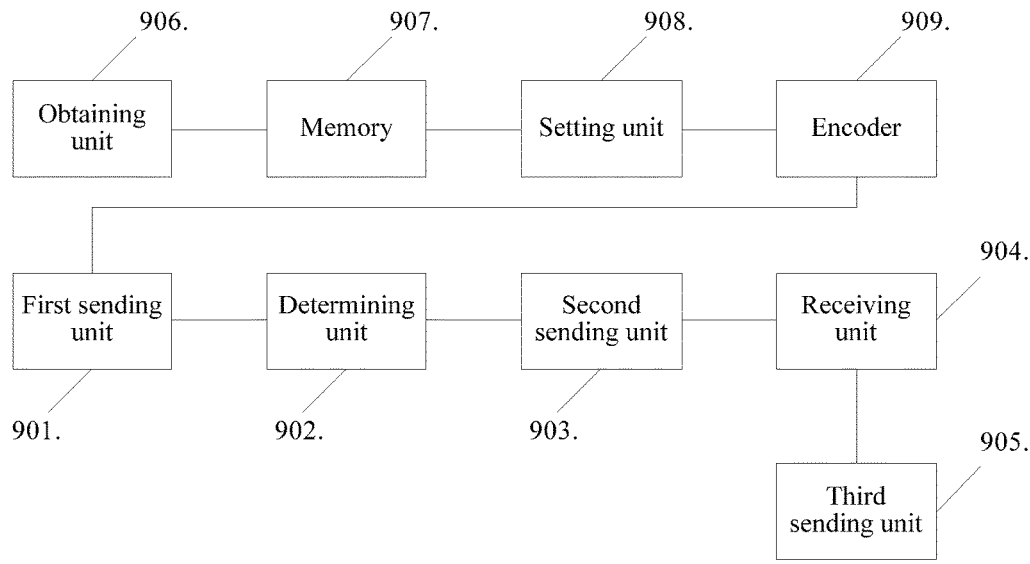
FIG. 9 is a schematic structural diagram of an embodiment of a first network device according to the present invention.

FIG. 9 shows an embodiment of a first network device according to the present invention. The first network device may be run in a network including the first network device. In a process in which the first network device sends a fountain code to UE, the UE is handed over from the first network device to another network device. The first network device includes:

A first sending unit 901 is configured to send at least one first data packet to the UE, where the first data packet is obtained by encoding an original data packet, the original data packet is data that needs to be sent to the UE, and a quantity of first data packets is greater than a quantity of original data packets.

In an embodiment of the present invention, the network device may further include:

an obtaining unit 906, configured to obtain a first codebook, where the first codebook includes a codebook vector, and encode the original data packet according to the codebook vector to obtain the first data packet.

It should be understood that, a method for obtaining the first codebook is not specifically limited in the present invention. Optionally, the first codebook may be stored in a memory 907 in the first network device, or determined by the obtaining unit 906 according to a specific network status, or a receiving unit 904 receives a message that is sent by another device and that includes the first codebook, so as to obtain the first codebook.

In an embodiment of the present invention, a specific encoding manner may be performing, by an encoder 909, point multiplication for an original data packet by using a codebook vector, to obtain a first data packet. For ease of description and understanding, an available codebook is $A_{L \times n}$, an encoding matrix consisting of M codebook vectors selected from L codebooks in $A_{L \times n}$ is $A_{M \times n}$, and an original data packet forms a vector $\alpha$, where A is an M×n matrix, and a is an n-dimensional vector. If indicated in a form of a matrix, a manner for point multiplication of each codebook and the vector $\alpha$ formed by the original data packet may be indicated as:

$$\beta_{M \times 1} = A_{M \times n} \alpha_{n \times 1}$$

where each element of an obtained vector $\beta_{M \times 1}$ is a first data packet. M>n.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed by a calculation unit on the network side or terminal side and that can achieve encoding objectives.

Further, the obtaining unit 906 is further configured to obtain a corresponding identifier of a first data packet corresponding to each codebook vector, where each first data packet includes a respective corresponding identifier, so that the UE determines, according to the corresponding identifier of the first data packet, a codebook vector corresponding to each first data packet, to reconstruct the original data packet. As in the foregoing example, an $i^{th}$ element in the vector $\beta_{M\times 1}$ corresponds to an $i^{th}$ first data packet, which is obtained through point multiplication of an $i^{th}$ row in A and $\alpha$ of the original data packet. Correspondingly, the $i^{th}$ first data packet corresponds to a codebook vector in the $i^{th}$ row in A.

Optionally, a setting unit 908 is configured to use i as the corresponding identifier, set the corresponding identifier in each first data packet, and send the first data packet to the UE by using the first sending unit 901.

It should be understood that, the present invention is not limited to using i as the corresponding identifier and setting i in the first data packet, and an identifier in another form may be used, or another manner may be used so that the UE obtains the codebook vector corresponding to each first data packet.

A determining unit 902 is configured to determine that the user equipment UE needs to be handed over from the first network device to a second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

A second sending unit 903 is configured to send a feedback control message to the UE, where the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE.

The receiving unit 904 is further configured to receive a feedback message sent by the UE, where the feedback message includes the indication information of the remaining sending quantity.

In the handover process, the first network device needs to notify the second network device of a message that is in downlink communication, to continue to send a first data packet that has not been sent by the first network device, so that the UE reconstructs an original signal (original data packets) according to first data packets sent by the first network device and the second network device. The first network device sends a feedback control message to the UE, so that the UE feeds back indication information of a remaining sending quantity k. In an embodiment of the present invention, the indication information of the remaining sending quantity may be in, but not limited to, the following forms:

the remaining sending quantity k; or a quantity of data packets that have been correctly received by the UE; or a proportion at which the UE loses a data packet; or a proportion at which the UE correctly receives a data packet.

It should be understood that, the present invention does not limit the indication information of the remaining sending quantity only to the several forms above, the indication information of the remaining sending quantity is aimed at indicating a quantity of first data packets that the second network device continues to send to the UE, and indication information of the remaining sending quantity that achieves the aim all belongs to the protection scope of the present invention.

A third sending unit 905 is configured to send an original data packet message to the second network device, to instruct the second network device to continue to send a first data packet to the UE according to the original data packet message, where the original data packet message includes the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets.

It should be understood that, a specific form of the location identifier of the second data packet is not limited in the present invention. Optionally, the location identifier is an index that is set in the second data packet.

For the third sending unit 905 being configured to send an original data packet message to the second network device, the present invention further gives two corresponding different implementation manners:

Implementation Manner 1:

The second data packet is all the original data packets, the original data packet message further includes a codebook vector usage message, and the codebook vector usage message is used to indicate codebook vectors used by the second network device when the second network device encodes the original data packets by using the first codebook, so that the second network device obtains the first data packet that the second network device needs to continue to send to the UE, where each original data packet includes a location identifier, so that the second network device determines, according to the location identifier, a location of each original data packet during encoding.

In this implementation manner, the first network device sends all original data packet messages to the second network device, so that the second network device continues to encode the original data packets according to the original data packets and the used codebook vectors.

Implementation Manner 2:

A quantity of second data packets is the remaining sending quantity k, the original data packet message further includes a codebook vector usage message, and the codebook vector usage message is used to indicate codebook vectors used by the second network device when the second network device encodes the original data packets by using the first codebook, where each original data packet includes a location identifier, so that the second network device determines, according to the location identifier, a location of each original data packet during encoding.

In this implementation manner, a quantity of second data packets is the remaining sending quantity k, and after the k second data packets are sent to the second network device, the second network device may perform encoding according to the second data packets to obtain first data packets, so that the UE performs decoding according to the first data packet sent by the first network device and the second data packets sent by the second network device, to obtain the original data packets.

In this embodiment, a downlink data sending apparatus is described. When a network device handover occurs when data in a form of a fountain code is sent, the first network device can ensure that when a fountain code encoding manner is used, no data is lost in a cell handover process, reducing data packet retransmission, improving handover efficiency, and resolving a problem that fountain code handover cannot be implemented in a network in a conventional handover form.

It should be understood that, the modules in FIG. 9 may be logically combined, divided, or changed. For example, the first sending unit 901, the second sending unit 903, and the third sending unit 905 may be combined into a sending unit or module, which may be specifically a transmitter or a sending module; the setting unit, the encoder, and the determining unit may be a processing unit, which may be specifically a processor.

Figure 10:
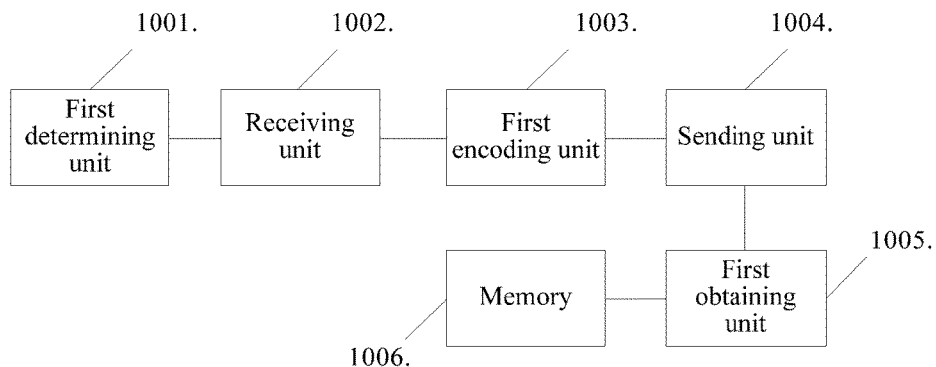
FIG. 10 is a schematic structural diagram of an embodiment of a second network device according to the present invention.

FIG. 10 shows an embodiment of a second network device according to the present invention. In a process in which another network apparatus sends data in a form of a fountain code to UE, the UE is handed over to the second network device, and the second network device continues to send a third data packet. The second network device includes:

A first determining unit 1001 is configured to determine that the UE is handed over from a first network device to the second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

A receiving unit 1002 is configured to receive an original data packet message, where the original data packet message includes indication information of a remaining sending quantity k, a second data packet, and a location identifier of the second data packet, the second data packet is m data packets selected from original data packets, m≥k, the remaining sending quantity k is at least greater than or equal to a difference between a quantity of first data packets needed by the UE to correctly restore all the original data packets and a quantity of first data packets correctly received by the UE, and the location identifier of the second data packet is identifiers of locations of the selected data packets in the original data packets.

In the handover process, the second network device needs to obtain a message that is in downlink communication of the first network device, to continue to send a first data packet that has not been sent by the first network device, so that the UE reconstructs an original signal (original data packets) according to first data packets sent by the first network device and the second network device. The first network device sends a feedback control message to the UE, so that the UE feeds back indication information of a remaining sending quantity k. In an embodiment of the present invention, the indication information of the remaining sending quantity may be in, but not limited to, the following forms:

the remaining sending quantity k; or
a quantity of data packets that have been correctly received by the UE; or
a proportion at which the UE loses a data packet; or
a proportion at which the UE correctly receives a data packet.

A first encoding unit 1003 is configured to encode the second data packet according to the location identifier of the second data packet, to obtain third data packets.

In an embodiment of the present invention, before the second data packet is encoded, the second network device further includes: a first obtaining unit 1005, configured to obtain a first codebook, where the first codebook includes a codebook vector, and the first codebook is used to encode the second data packet.

It should be understood that, a method for obtaining the first codebook is not specifically limited in the present invention. Optionally, the first codebook may be stored in a memory 1006 in the second network device, or determined by the second network device according to a specific network status, or the receiving unit 1002 of the second network device receives a message that is sent by another device and that includes the first codebook, so as to obtain the first codebook.

Figure 11:
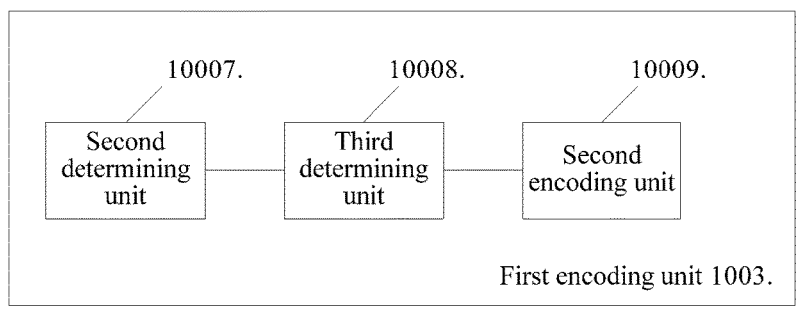
FIG. 11 is a structural diagram of an embodiment of a first encoding unit 1003 in the second network device shown in FIG. 10 according to the present invention.

Optionally, the original data packet message further includes a codebook vector usage message, and the codebook vector usage message is used to indicate codebook vectors used by the second network device when the second network device encodes the original data packets; and for the encoding, by the first encoding unit, the second data packet according to the location identifier of the second data packet, specifically, FIG. 11 shows that the first encoding unit 1003 includes:

a second determining unit 10007, configured to determine used encoding vectors from the first codebook, to encode the original data packets, where
each original data packet includes a location identifier;
a third determining unit 10008, configured to determine, according to the location identifier, a location of each original data packet during encoding by the first network device, where the third determining unit is further configured to determine, according to the codebook vector usage message, codebook vectors used by the second network device when the second network device encodes the second data packet; and a second encoding unit 10009 configured to encode the original data packets according to the used codebook vectors, the original data packets, and the location identifiers:

separately multiply an $i^{th}$ element in a $j^{th}$ codebook vector by m original data packets whose location identifiers indicate i, and add up all m obtained multiplication results, to obtain a third data packet corresponding to the $j^{th}$ codebook vector, where the $j^{th}$ codebook vector is one of the used codebook vectors.

Figure 12:
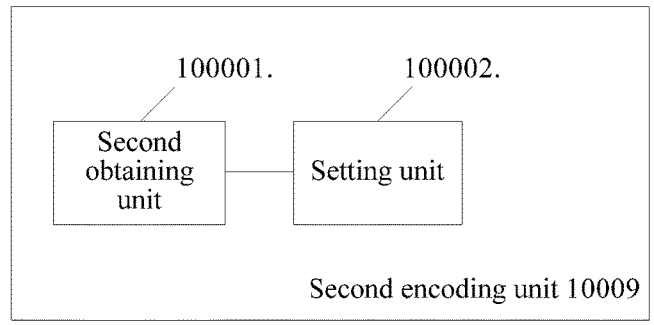
FIG. 12 is a structural diagram of an embodiment of a second encoding unit 10009 shown in FIG. 11 according to the present invention.

In an embodiment of the present invention, FIG. 12 shows that the second encoding unit includes:

a second obtaining unit 100001, configured to obtain each codebook vector and a corresponding identifier of a third data packet; and a setting unit 100002, configured to set the corresponding identifier in the corresponding third data packet, so that the UE determines, according to the corresponding identifier of the first data packet, a codebook vector corresponding to each third data packet, to reconstruct an original data packet.

It should be understood that, the present invention does not limit the original data packet message to including only the content above. The second data packet is m data packets selected from the original data packets, and the present invention gives two possible examples:

Implementation Manner 1:
The original data packet message further includes a m original data packets, and a value of m is a quantity of all the original data packets for encoding.

In this case, the encoding method may be the same as that in the encoding embodiment given for the encoder 909 in the embodiment shown in FIG. 9, and is equivalent to a form of an encoding process of the first encoding unit 1003, that is, all the original data packets are encoded, to obtain third data packets:

$$\beta_{P\times 1}=A_{P\times n}\alpha_{n\times 1}$$

where $A_{P\times n}$ consists of used codebook vectors, P third data packets are obtained, and P≥k. Or Implementation Manner 2:

The original data packet message further includes m original data packets, and a value of m is the quantity k of first data packets that are needed to continue to send to the UE.

In this case, for ease of description and understanding, a matrix form may also be used:

$$\beta'_{Q\times 1}=A_{Q\times n}\alpha_{k\text{-}sparse}$$

where $A_{Q\times n}$ consists of used codebook vectors, $\alpha_{k\text{-}sparse}$ is an n-dimensional vector, an $i^{th}$ element of $\alpha_{k\text{-}sparse}$ is an original data packet whose location identifier indicates i, other locations are all 0, and Q≥k.

It should be understood that, the matrix form in this embodiment of the present invention is intended only for ease of description. In an implementation process of the present invention, a selected codebook or matrix may be, but not limited to, an array or a sequence in another form that is stored by a storage unit on a network side/terminal, and corresponding matrix multiplication and involved encoding operations may be mathematical operations between one number and another number that are performed by a processing unit and that can achieve encoding objectives.

After the original data packets are encoded according to the two implementation manners, third data packets are obtained, and sent to the UE, so that the UE obtains the original data packets. It should be understood that, according to the two different implementation manners, the UE has different decoding manners. When the technical solution of the present invention is implemented, the second network device may send a message by using a sending unit 1004, to notify the UE of an encoding manner for the third data packets included in the sent original data packet message. In an embodiment, this embodiment of the present invention is implemented in a manner preset in the memory, and the preset manner is an encoding manner for original data packets that is agreed by a network device and the UE device.

The sending unit 1004 is further configured to send at least k third data packets to the UE.

In this embodiment, a second network device that receives a data packet that is sent by a first network device to UE when the second network device determines that a network device handover occurs in a downlink data sending process is described, and in this embodiment, an encoding manner for a third data packet that the second network device needs to continue to send to the UE and related steps are described, ensuring that when a fountain code encoding manner is used, no data is lost in a cell handover process, reducing data packet retransmission, improving handover efficiency, and resolving a problem that fountain code handover cannot be implemented in a network in a conventional handover form.

Figure 13A:
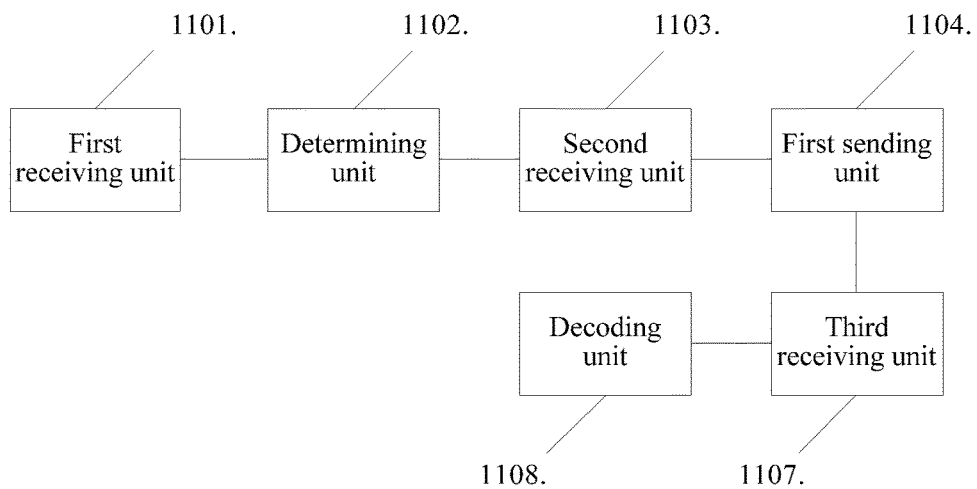
FIG. 13a and FIG. 13b are structural diagrams of an embodiment of user equipment according to the present invention.
Figure 13B:
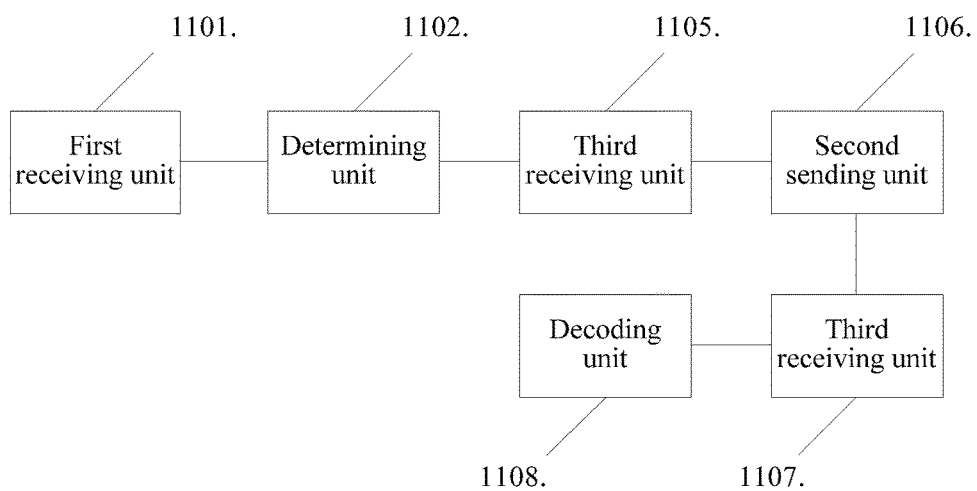

FIG. 13a and FIG. 13b show an embodiment of a terminal apparatus according to the present invention. The terminal apparatus receives a data packet in a form of a fountain code, and when handed over between corresponding serving network devices, configured to receive and restore a data packet sent by a different network device. Specifically:

A first receiving unit 1101 is configured to receive at least one first data packet sent by a first network device, where the first data packet is obtained by encoding an original data packet, and the at least one first data packet is used to perform decoding to obtain the original data packet.

A determining unit 1102 is configured to determine that the terminal apparatus is handed over from the first network device to a second network device.

When the determining unit 1102 determines that the terminal apparatus is handed over from the first network device to the second network device, a second receiving unit 1103 (shown in FIG. 13a) or a third receiving unit 1105 (shown in FIG. 13b) included in the terminal apparatus receives a feedback control message sent by a network side, and then a corresponding first sending unit 1104 (shown in FIG. 13a) or second sending unit 1106 (shown in FIG. 13b) sends a feedback message, to notify the network side of indication information of a quantity of remaining data packets that the network side needs to continue to send. For the second receiving unit 1103 and the first sending unit 1104, the present invention gives an implementation manner 1. For the third receiving unit 1105 and the second sending unit 1106, the present invention gives an implementation manner 2. The two implementation manners are specifically described below:

Implementation Manner 1:

The second receiving unit 1103 is configured to receive a feedback control message sent by the first network device, where the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE; and the first sending unit 1104 is configured to send a feedback message to the first network device or the second network device, where the feedback message includes the indication information of the remaining sending quantity. Or Implementation Manner 2:

The third receiving unit 1105 is configured to receive a feedback control message sent by the second network device, where the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE; and the second sending unit 1106 is configured to send a feedback message to the second network device, where the feedback message includes the indication information of the remaining sending quantity.

In an embodiment of the present invention, the indication information of the remaining sending quantity is:

the remaining sending quantity k; or a quantity of data packets that have been correctly received by the UE; or a proportion at which the UE loses a data packet; or a proportion at which the UE correctly receives a data packet.

The third receiving unit 1107 is further configured to receive third data packets sent by the second network device, where the third data packets sent by the second network device are used to perform decoding to obtain original data packets.

A decoding unit 1108 is configured to decode the first data packet sent by the first network device and the third data packets sent by the second network device, to obtain the original data packets.

It should be understood that, the modules in FIG. 13a and FIG. 13b may be logically combined, divided, or changed. For example, the first receiving unit, the second receiving unit, and third receiving unit in FIG. 13a and FIG. 13b may be combined into a receiving unit or module, which may be specifically a receiver or a receiving module.

Figure 14:
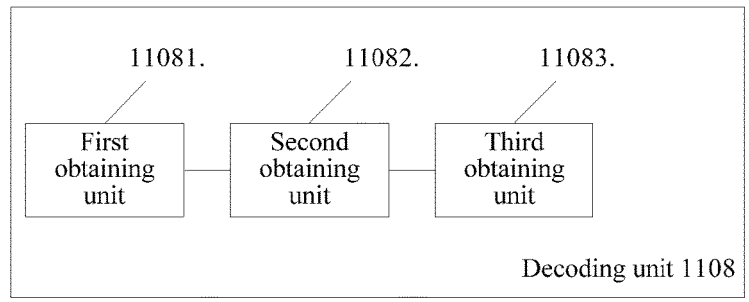
FIG. 14 is a structural diagram of an embodiment of a decoding unit 1108 of the user equipment shown in FIG. 13 according to the present invention.

FIG. 14 shows that, in an embodiment of the present invention, the decoding unit 1108 includes:

a first obtaining unit 11081, configured to obtain a first codebook, where the first codebook includes a codebook vector;

a second obtaining unit 11082, configured to obtain a corresponding identifier included in the first data packet sent by the first network device, where the corresponding identifier indicates a codebook vector corresponding to each first data packet; and a third obtaining unit 11083, configured to obtain corresponding identifiers included in the third data packets sent by the second network device, where the corresponding identifiers indicate a codebook vector corresponding to each third data packet; and the decoding unit 1108 is further configured to decode, according to the first codebook, the corresponding identifier included in the first data packet sent by the first network device, and the corresponding identifiers included in the third data packets sent by the second network device, the first data packet sent by the first network device and the third data packets sent by the second network device, to obtain the original data packets.

Specifically, corresponding to the implementation manner 1 and the implementation manner 2 corresponding to the first encoding unit 1003 shown in FIG. 11, this embodiment gives two different decoding manners, where the decoding manners are determined according to characteristics of the third data packets sent by the second network device:

Decoding Manner 1:

If a quantity of first data packets that need to be sent to the UE is S, and the remaining sending quantity is k, a quantity of first data packets that have been sent by the first network device before the handover is T=S−k. When an original data packet message sent from the first network device to the second network device includes m original data packets, where a value of m is a quantity of all original data packets for encoding, first data packets $\beta_{11}, \beta_{12}, \beta_{13}, \ldots,$ and $\beta_{1T}$ sent by the first network device and received on the UE side and third data packets $\beta_{21}, \beta_{22}, \beta_{23}, \ldots,$ and $\beta_{2k}$ sent by the second network device and received on the UE side jointly form an equation, that is:

$$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix} = A_{decode}\alpha.$$

In obtained $\alpha$, each element is an original data packet. It should be understood that, S is at least greater than a length of the original data packets, so as to ensure that the original data packets can be obtained by decoding according to a value of S and the matrix $A_{decode}$.

Decoding Manner 2:

If a quantity of first data packets that need to be sent to the UE is S, and the remaining sending quantity is k, a quantity of first data packets that have been sent by the first network device before the handover is T=S−k. When an original data packet message sent from the first network device to the second network device includes m original data packets, where a value of m is the quantity k of first data packets that are needed to continue to send to the UE, first data packets $\gamma_{11}, \gamma_{12}, \gamma_{13}, \ldots,$ and $\gamma_{1P}$ sent by the first network device and received on the UE side and second network device sent by third data packets $\gamma_{21}, \gamma_{22}, \gamma_{23}, \ldots,$ and $\gamma_{2Q}$ sent by the second network device and received on the UE side are decoded:

$$\begin{bmatrix} \gamma_{21} \\ \gamma_{22} \\ \vdots \\ \gamma_{2Q} \end{bmatrix} = A_{Q \times n}\alpha_{k-sparse} \text{ and } \begin{bmatrix} \gamma_{11} \\ \gamma_{12} \\ \vdots \\ \gamma_{1P} \end{bmatrix} = A_{P \times n}\alpha_{n \times 1}.$$

In an embodiment, a quantity of original data packets included in obtained $\alpha_{k-sparse}$ is k, and other locations are 0. Then all the original data packets are obtained by decoding according to the original data packets determined by $\alpha_{k-sparse}$ and an equation $$\begin{bmatrix} \gamma_{11} \\ \gamma_{12} \\ \vdots \\ \gamma_{1P} \end{bmatrix} = A_{P \times n}\alpha_{n \times 1}.$$

It should be understood that, a specific decoding manner in the decoding manner 2 is not limited to the foregoing embodiment, and the present invention does not limit another specific decoding manner.

The first obtaining unit 11081, the second obtaining unit 10082, and the third obtaining unit 11083 in the decoding unit may be a same module, or be integrated in a processing unit or the decoding unit.

It should be understood that, the present invention is not limited to the two decoding methods in the decoding manner 1 and the decoding manner 2, for each matrix in the example, during specific implementation, a memory or a unit or module having a storage function in the UE apparatus may store the matrix or vector, the matrix or vector may be in a form of an array, a sequence, or binary code, and the decoding unit may perform decoding by using a mathematical operation in another form.

In this embodiment, it is described that in a downlink data sending process, when a UE apparatus determines that a network device handover occurs, the UE apparatus receives a feedback message, and notifies, according to the feedback message and a current status of first data packet receiving, a network side device of a quantity of first data packets that the network side device needs to continue to send, to reduce a quantity of retransmitted messages. In this embodiment, decoding manners and related steps of the UE are further described, and it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 15:
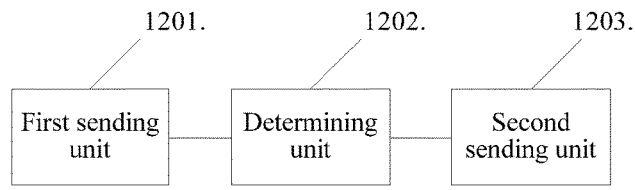
FIG. 15 is a structural diagram of an embodiment of a first network device according to the present invention.

FIG. 15 shows an embodiment of a first network device according to the present invention. The first network device is used in a network in a form of a fountain code, and when determining that UE is handed over from the first network device to another network device, the first network device implements a function of sending information required in a handover process to a second network device. The first network device specifically includes:

A first sending unit 1201 is configured to send at least one first data packet to the UE, where the first data packet is obtained by encoding an original data packet, the original data packet is data that needs to be sent to the UE, and a quantity of first data packets is greater than a quantity of original data packets.

Figure 16:
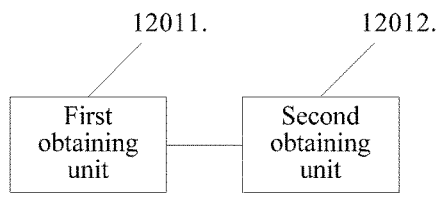
FIG. 16 is structural diagram of apparatuses involved in an encoding process of the first network device shown in FIG. 15 according to the present invention.

FIG. 16 shows that, in an embodiment of the present invention, the first data packet is obtained by encoding an original data packet includes:

A first obtaining unit 12011 is configured to obtain a first codebook, where the first codebook includes a codebook vector, and encode the original data packet according to the codebook vector to obtain the first data packet.

It should be understood that, a method for obtaining the first codebook is not specifically limited in the present invention. Optionally, the first codebook may be stored in the first network device, or determined by the first network device according to a specific network status, or the first network device receives a message that is sent by another device and that includes the first codebook, so as to obtain the first codebook.

In an embodiment of the present invention, a specific encoding manner may be performing, by an encoding unit 12013 or a processing unit 12014, point multiplication for an original data packet by using a codebook vector, to obtain a first data packet. For ease of description and understanding, an available codebook is $A_{L \times n}$, an encoding matrix consisting of M codebook vectors selected from L codebooks in $A_{L \times n}$ is $A_{M \times n}$, and an original data packet forms a vector $\alpha$, where A is an M×n matrix, and a is an n-dimensional vector. If indicated in a form of a matrix, a manner for point multiplication of each codebook and the vector $\alpha$ formed by the original data packet may be indicated as:

$$\beta_{M \times 1} = A_{M \times n} \alpha_{n \times 1}$$

where each element of an obtained vector $\beta_{M \times 1}$ is a first data packet. M>n.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

A second obtaining unit 12012 is configured to obtain a corresponding identifier of a first data packet corresponding to each codebook vector, where each first data packet includes a respective corresponding identifier, so that the UE determines, according to the corresponding identifier of the first data packet, a codebook vector corresponding to each first data packet, to reconstruct the original data packet. As in the foregoing example, an $i^{th}$ element in the vector $\beta_{M \times 1}$ corresponds to an $i^{th}$ first data packet, which is obtained through point multiplication of an $i^{th}$ row in A and $\alpha$ of the original data packet. Correspondingly, the $i^{th}$ first data packet corresponds to a codebook vector in the $i^{th}$ row in A.

Optionally, i is used as the corresponding identifier, and set in each first data packet, and the first data packet is sent to the UE.

It should be understood that, the present invention is not limited to using i as the corresponding identifier and setting i in the first data packet, and an identifier in another form may be used, or another manner may be used so that the UE obtains the codebook vector corresponding to each first data packet.

A determining unit 1202 is configured to determine that the user equipment UE needs to be handed over from the first network device to the second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

A second sending unit 1203 is configured to send an original data packet message to the second network device, to instruct the second network device to continue to send a first data packet to the UE according to the original data packet message, where the original data packet message includes all the original data packets and a codebook vector usage message, and the codebook vector usage message is used to indicate codebook vectors used by the second network device when the second network device encodes the original data packets by using the codebook vectors.

In an embodiment, the original data packet message is all the original data packet messages.

In this embodiment, it is described that in a downlink data sending process, when the first network device determines that a network device handover occurs, the first network device sends an original data packet to a second network device, so that the second network device performs encoding according to the original data packet to obtain a first data packet. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

It should be understood that, combination and division of the modules are not limited in the embodiment shown in FIG. 15 and FIG. 16. For example, the first sending unit and the second sending unit may be a same sending unit or sending apparatus; the first obtaining unit and the second obtaining unit may be a same obtaining unit.

Figure 17:
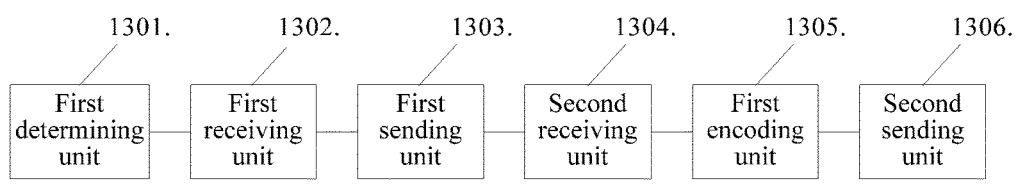
FIG. 17 shows a structural diagram of an embodiment of a second network device according to the present invention.

FIG. 17 shows an embodiment of a second network device according to the present invention. The apparatus is specifically used in a network in a form of a fountain code, and when determining that UE is handed over from another device to the second network device, the second network device implements a function. The apparatus specifically includes:

A first determining unit 1301 is configured to determine, according to a handover indication, that the UE is handed over from a first network device to the second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

It should be understood that the first obtaining unit and the second obtaining unit may be combined.

A first receiving unit 1302 is configured to receive an original data packet message, where the original data packet message includes all original data packets and a codebook vector usage message, and the codebook vector usage message is used to indicate codebook vectors used by the second network device when the second network device encodes the original data packets by using the codebook vectors.

A first sending unit 1303 is configured to send a feedback control message to the UE, where the feedback control message is used to instruct the UE to send indication information of a remaining sending quantity, and the remaining sending quantity k is a quantity of first data packets that the second network device continues to send to the UE.

The indication information of the remaining sending quantity is:

the remaining sending quantity k; or a quantity of data packets that have been correctly received by the UE; or a proportion at which the UE loses a data packet; or a proportion at which the UE correctly receives a data packet.

A second receiving unit 1304 is configured to receive a feedback message sent by the UE, where the feedback message includes the indication information of the remaining sending quantity.

A first encoding unit 1305 is configured to encode the original data packets according to a first state, to obtain at least k third data packets.

Figure 18:
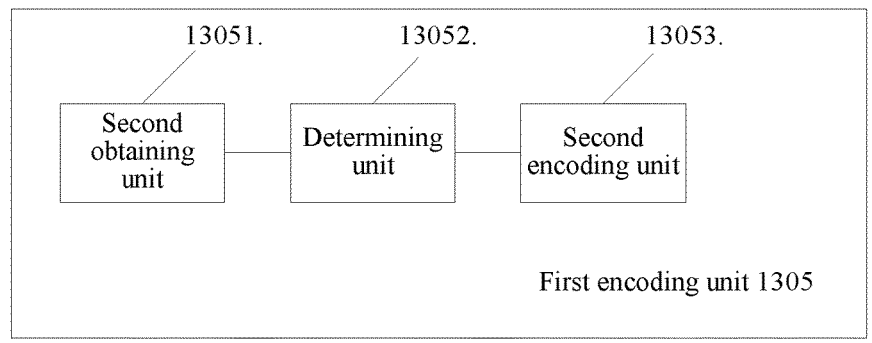
FIG. 18 shows a structural diagram of an embodiment of a first encoding unit in a second network device according to the present invention.

In an embodiment, FIG. 18 shows that the first encoding unit 1305 further includes:

A second obtaining unit 13051 is configured to obtain a first codebook, where the first codebook includes a codebook vector.

It should be understood that, a method for obtaining the first codebook is not specifically limited in the present invention. Optionally, the first codebook may be stored in the first network device by using a storage unit or a memory, or determined by the first network device according to a specific network status, or the first network device receives a message that is sent by another device and that includes the first codebook, so as to obtain the first codebook.

A determining unit 13052 is configured to determine used encoding vectors from the first codebook according to the codebook vector usage message, where the original data packet message further includes a codebook vector usage message, and the codebook vector usage message is used to indicate codebook vectors used when the original data packets are encoded; and each original data packet further including a location identifier, determine, according to the location identifier, a location of each original data packet during encoding by the first network device.

A second encoding unit 13053 is configured to encode the original data packets by using the determined codebook vectors.

Figure 19:
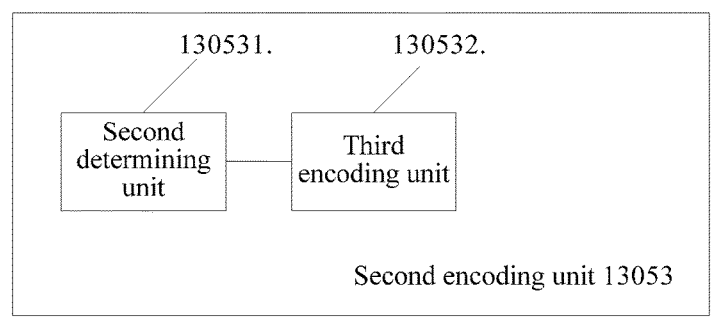
FIG. 19 shows a structural diagram of an embodiment of a second encoding unit in a first encoding unit according to the present invention.

In an embodiment, FIG. 19 shows that the second encoding unit further includes:

The second encoding unit encodes the original data packets according to the used codebook vectors, the original data packets, and location identifiers of the original data packets:

A second determining unit 130531 is configured to determine m original data packets, and further configured to determine a location identifier corresponding to each original data packet in the m original data packets, where the location identifier is used to indicate a location of the corresponding original data packet in all the original data packets, m≥k, and a value of k is the remaining sending quantity.

A third encoding unit 130532 is configured to separately multiply an $i^{th}$ element in a $j^{th}$ codebook vector by m original data packets whose location identifiers indicate i, to obtain m multiplication results, and further configured to add up all the m obtained multiplication results, to obtain a third data packet corresponding to the $j^{th}$ codebook vector, where the $j^{th}$ codebook vector is one of the used codebook vectors.

In an embodiment of the present invention, the third encoding unit further includes:

a third obtaining unit, configured to obtain a corresponding identifier of a third data packet corresponding to each codebook vector; and a setting unit, configured to set the corresponding identifier of the third data packet in the corresponding third data packet, so that the UE determines, according to the corresponding identifier of the third data packet, a codebook vector corresponding to each first data packet, to reconstruct an original data packet.

It should be understood that, a specific encoding manner of the first encoding unit 1305 is not limited in the present invention, and another manner may be used to encode data. Correspondingly, the UE should have a corresponding method in a decoding process to perform decoding to obtain an original data packet. Specifically, the present invention gives two possible examples:

Implementation Manner 1:

A value of m is a quantity of all the original data packets. In this case, the encoding method may be the same as that in the embodiment given in step 101, that is, all the original data packets are encoded, to obtain third data packets:

$$\beta_{P\times 1}=A_{P\times n}\alpha_{n\times 1}$$

where $A_{P\times n}$ consists of used codebook vectors, P first data packets are obtained, and P≥k. Or Implementation Manner 2:

A value of m is the quantity k of first data packets that are needed to continue to send to the terminal apparatus.

In this case, for ease of description and understanding, a matrix form may also be used:

$$\beta'_{Q\times 1}=A_{Q\times n}\alpha_{k\text{-}sparse}$$

where $A_{Q\times n}$ consists of used codebook vectors, $\alpha_{k\text{-}sparse}$ is an n-dimensional vector, an $i^{th}$ element of $\alpha_{k\text{-}sparse}$ is an original data packet whose location identifier indicates i, other locations are all 0, and Q≥k.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

After the original data packets are encoded according to the two implementation manners, third data packets are obtained, and sent to the UE, so that the UE obtains the original data packets. It should be understood that, according to the two different implementation manners, the UE has different decoding manners. When the technical solution of the present invention is implemented, the second network device may send a message, to notify the UE of an encoding manner for the third data packets included in the sent original data packet message. In an embodiment, this embodiment of the present invention is implemented in a preset manner, and the preset manner is an encoding manner for original data packets that is agreed by a network device and the UE device.

Further, a corresponding identifier of a third data packet corresponding to each codebook vector is obtained, and set in the corresponding third data packet, so that the UE determines, according to the corresponding identifier of the third data packet, a codebook vector corresponding to each third data packet, to reconstruct an original data packet.

As in the foregoing example, an $i^{th}$ element in the vector $\beta_{M \times 1}$ corresponds to an $i^{th}$ third data packet, which is obtained through point multiplication of an $i^{th}$ row in A and $\alpha$ of the original data packet. Correspondingly, the $i^{th}$ third data packet corresponds to a codebook vector in the $i^{th}$ row in A.

Optionally, i is used as the corresponding identifier, and set in each third data packet, and the third data packet is sent to the UE.

It should be understood that, the present invention is not limited to using i as the corresponding identifier and setting i in the third data packet, and an identifier in another form may be used, or another manner may be used so that the UE obtains the codebook vector corresponding to each third data packet.

A second sending unit 1306 is configured to continue to send the third data packets to the UE according to the original data packet message.

In this embodiment, a network device that: when determining that a network device handover occurs in a downlink data sending process, performs encoding according to a quantity of first data packets that the network device needs to continue to send to UE, and sends the first data packets to the UE is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

It should be understood that, logical combination and division of the units in the apparatus shown in FIG. 17 are not limited in the present invention. For example, the first receiving unit and the second receiving unit may be a same receiving unit or receiving apparatus; the first sending unit and the second sending unit may be a same sending unit or sending apparatus.

Figure 20:
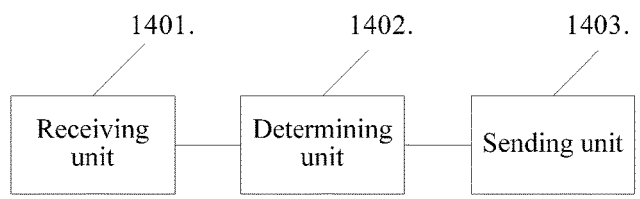
FIG. 20 shows a structural diagram of an embodiment of a first network device according to the present invention.

FIG. 20 shows an embodiment of a first network device according to the present invention. The first network device receives, in a form of a fountain code, a first data packet sent by a terminal apparatus, and the terminal needs to be handed over to another network device. The first network device includes:

A receiving unit 1401 is configured to receive at least one first data packet sent by the UE, where the first data packet is obtained by encoding an original data packet, and the at least one first data packet is used to perform decoding to obtain the original data packet.

A determining unit 1402 is configured to determine that the UE is handed over from the first network device to a second network device.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

A sending unit 1403 is configured to send the first data packet to the second network device, so that the second network device may restore the original data packet according to the first data packet.

In this embodiment, an embodiment of an apparatus that sends a received first data packet to a second network device when determining that a network device handover occurs in an uplink data sending process is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 21:
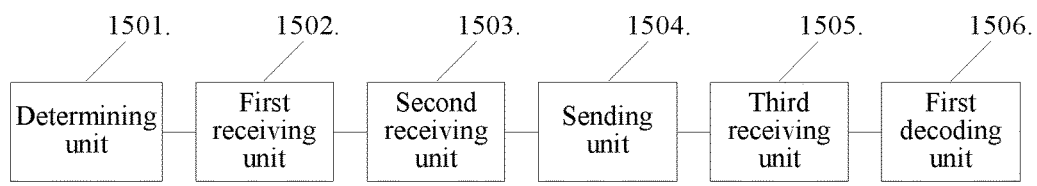
FIG. 21 shows a structural diagram of an embodiment of a second network device according to the present invention.

FIG. 21 shows an embodiment of a second network device according to the present invention, which is a specific implementation manner of the second network device when the second network device determines that a terminal apparatus is handed over from another network device to the second network device in a process in which the another network device receives, in a form of a fountain code, a first data packet sent by the terminal apparatus. The second network device includes:

A determining unit 1501 is configured to determine that the UE is handed over to the second network device, where the second network device is configured to continue to receive a first data packet sent by the UE.

It should be understood that, there are multiple processes of decision-making and negotiation of the first network device and the second network device, aimed at ensuring that a service of the UE is handed over from the first network device to the second network device, and details are not described herein. This step may be initiated by, but not limited to, the first network device, the second network device, the UE, or another device. The handover may be performed because the UE moves into a coverage area of the second network device or a communications device determines signal strength.

A first receiving unit 1502 is configured to receive a first data packet sent by a first network device.

A second receiving unit 1503 is configured to receive a feedback control message sent by the UE, where the feedback control message is used to instruct the second network device to send indication information of a remaining sending quantity, and the remaining sending quantity k is at least greater than or equal to a difference between a quantity of first data packets needed by the second network device to correctly restore all original data packets and a quantity of first data packets correctly received by the UE.

Optionally, the indication information of the remaining sending quantity is:

the remaining sending quantity k; or a quantity of data packets that have been correctly received by the first network device; or a proportion at which the first network device loses a data packet; or a proportion at which the first network device correctly receives a data packet.

A sending unit 1504 is configured to send a feedback message to the UE, where the feedback message includes the indication information of the remaining sending quantity.

A third receiving unit 1505 is configured to receive at least k third data packets sent by the UE.

A first decoding unit 1506 is configured to decode the third data packets sent by the UE and the first data packet sent by the first network device, to obtain the original data packets.

Figure 22:
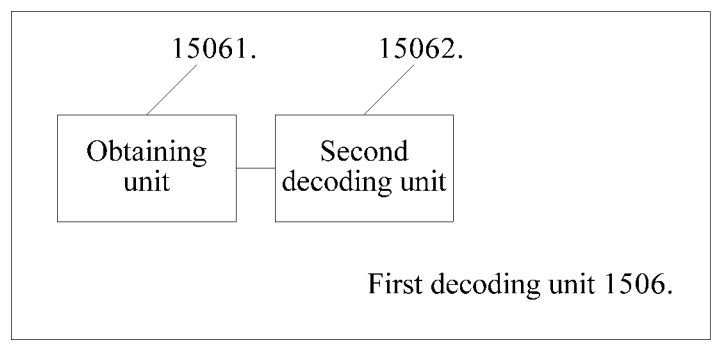
FIG. 22 shows a structural diagram of a first decoding unit 1506 in the second network device shown in FIG. 21 according to the present invention.

FIG. 22 shows that, in an embodiment of the present invention, the first decoding unit 1506 further includes:

an obtaining unit 15061, configured to obtain a first codebook, where the first codebook includes a codebook vector, where the third data packets sent by the UE and the first data packet sent by the first network device include corresponding identifiers, and the corresponding identifiers are used to determine a codebook vector respectively corresponding to each first data packet or each third data packet; and a second decoding unit 15062, configured to perform decoding according to the third data packets sent by the UE, the first data packet sent by the first network device, and the first codebook, to obtain the original data packets. The original data packets are a message or data that the UE needs to send to a network side.

If a quantity of first data packets that need to be sent to the second network device is S, and the remaining sending quantity is k, a quantity of first data packets that have been received by the first network device before the handover is T=S−k. First data packets $\beta_{11}, \beta_{12}, \beta_{13}$, and $\beta_{1T}$ sent by the first network device to the second network side device and third data packets $\beta_{21}, \beta_{22}, \beta_{23}, \ldots,$ and $\beta_{2k}$ sent by the UE to the second network side device jointly form an equation, that is:

$$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix} = A_{decode}\alpha.$$

In obtained α, each element is an original data packet. It should be understood that, S is at least greater than a length of the original data packets, so as to ensure that the original data packets can be obtained by decoding according to a value of S and the matrix $A_{decode}$. $A_{decode}$ consists of codebook vectors, and each codebook column vector corresponds to one element in $$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix}$$

according to an encoding order.

It should be understood that, during specific implementation, each matrix in the example may be, but not limited to, an array, a sequence, or binary code stored in a memory of the UE apparatus, and a decoding operation may be a mathematical operation in another form.

It should be understood that, logical combination and division of the units in the apparatus shown in FIG. 21 are not limited in the present invention. For example, the first receiving unit, the second receiving unit, and the third receiving unit may be a same receiving unit or receiving apparatus.

In this embodiment, a process of receiving a first data packet and a third data packet when determining that a network device handover occurs in an uplink data sending process is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

Figure 23:
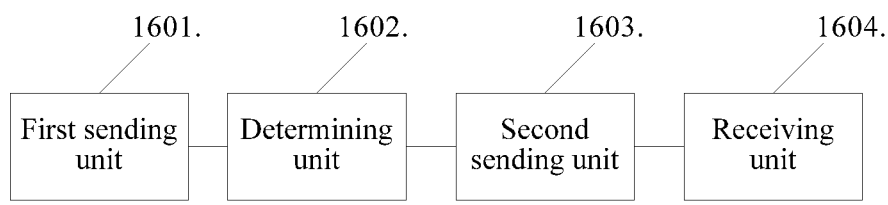
FIG. 23 shows a structural diagram of another embodiment of a second network device according to the present invention.

FIG. 23 shows an embodiment of user equipment according to the present invention. When another network device receives, in a form of a fountain code, a first data packet sent by the UE, the UE is handed over from the another network to a second network device. The second network device includes:

A first sending unit 1601 is configured to send at least one first data packet to a first network device, where the first data packet is obtained by encoding an original data packet, the original data packet is data that needs to be sent to a network side, and a quantity of first data packets is greater than a quantity of original data packets.

Figure 24:
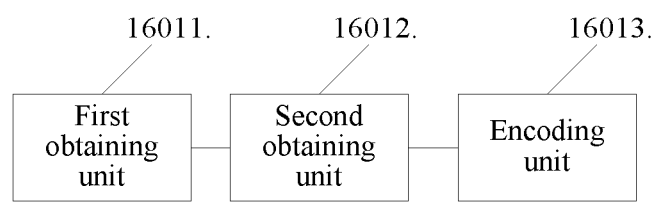
FIG. 24 shows a structural diagram of an apparatus for obtaining a first data packet in the second network device shown in FIG. 23.

FIG. 24 shows a specific embodiment of that the first data packet is obtained by encoding an original data packet:

a first obtaining unit 16011 is configured to obtain the original data packet, where the original data packet is a message that the UE needs to send to the first network device or the second network device;

a second obtaining unit 16012 is configured to obtain a first codebook, where the first codebook is used to encode the original data packet; and an encoding unit 16013 is configured to encode the original data packet according to the original data packet and the first codebook, to obtain the first data packet.

A determining unit 1602 is configured to determine that the user equipment UE is handed over from the first network device to the second network device.

A second sending unit 1603 is configured to send a feedback control message to the second network device, where the feedback control message is used to instruct the second network device to send indication information of a remaining sending quantity k, and the remaining sending quantity k is at least greater than or equal to a difference between a quantity of first data packets needed by the second network device to correctly restore all the original data packets and a quantity of first data packets correctly received by the UE.

Optionally, the indication information of the remaining sending quantity is:

the remaining sending quantity k; or a quantity of data packets that have been correctly received by the first network device; or a proportion at which the first network device loses a data packet; or a proportion at which the first network device correctly receives a data packet.

A receiving unit 1604 is configured to receive a feedback message sent by the second network device, where the feedback message includes the indication information of the remaining sending quantity.

The first sending unit is further configured to send third data packets to the second network device, so that the second network device may restore original data packets according to the third data packets. In an embodiment, the third data packets are first data packets that have not been sent to the first network device.

It should be understood that, logical combination and division of the units in the apparatus shown in FIG. 23 are not limited in the present invention. For example, the first sending unit and the second sending unit may be a sending unit or sending apparatus.

In this embodiment, a second network side device that receives a first data packet and a third data packet when determining that a network device handover occurs in an uplink data sending process is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

It should be understood that, before the first sending unit 1601 sends the at least one first data packet to the first network device, an encoding unit (which is not shown or is an encoding unit involved in this embodiment) may be included, to encode the original data packet, to obtain the first data packet. Optionally, the third data packet may be a third data packet that has not been sent to the first network device.

Figure 25:
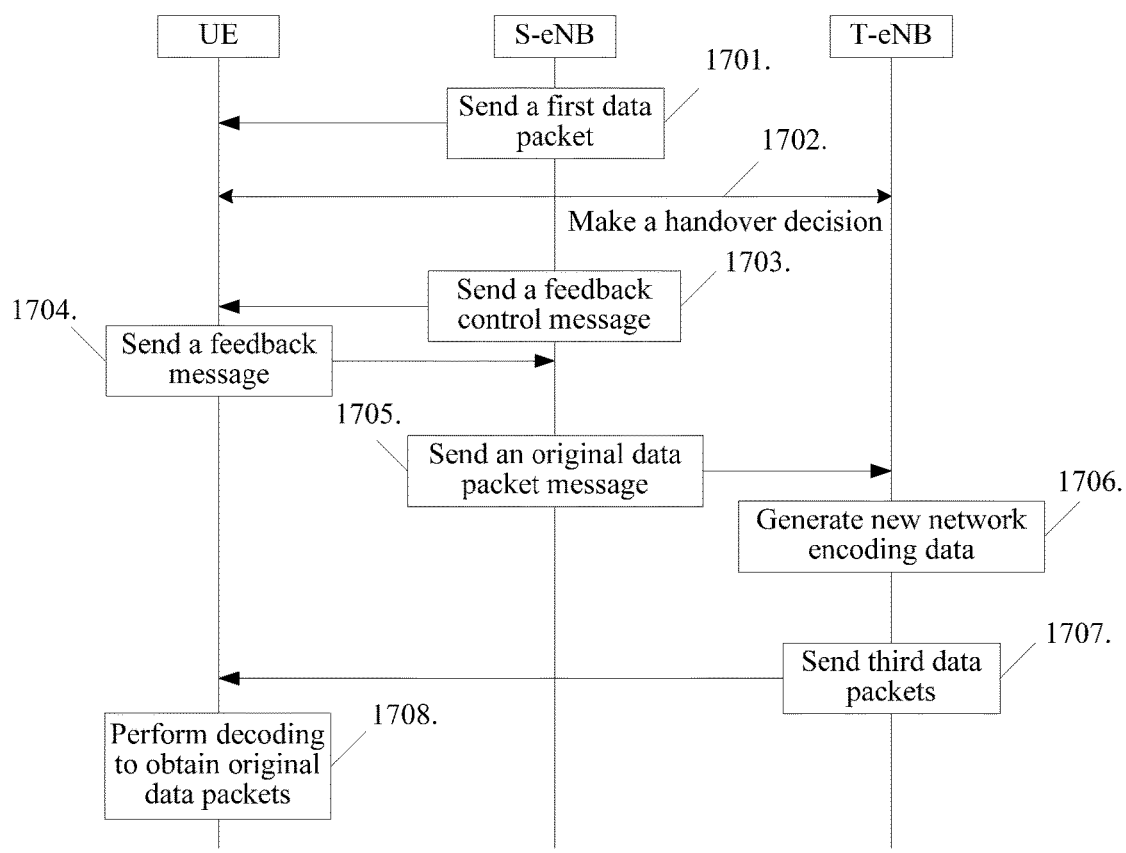
FIG. 25 shows a schematic diagram of an embodiment of a method for data transmission according to the present invention.
Figure 26:
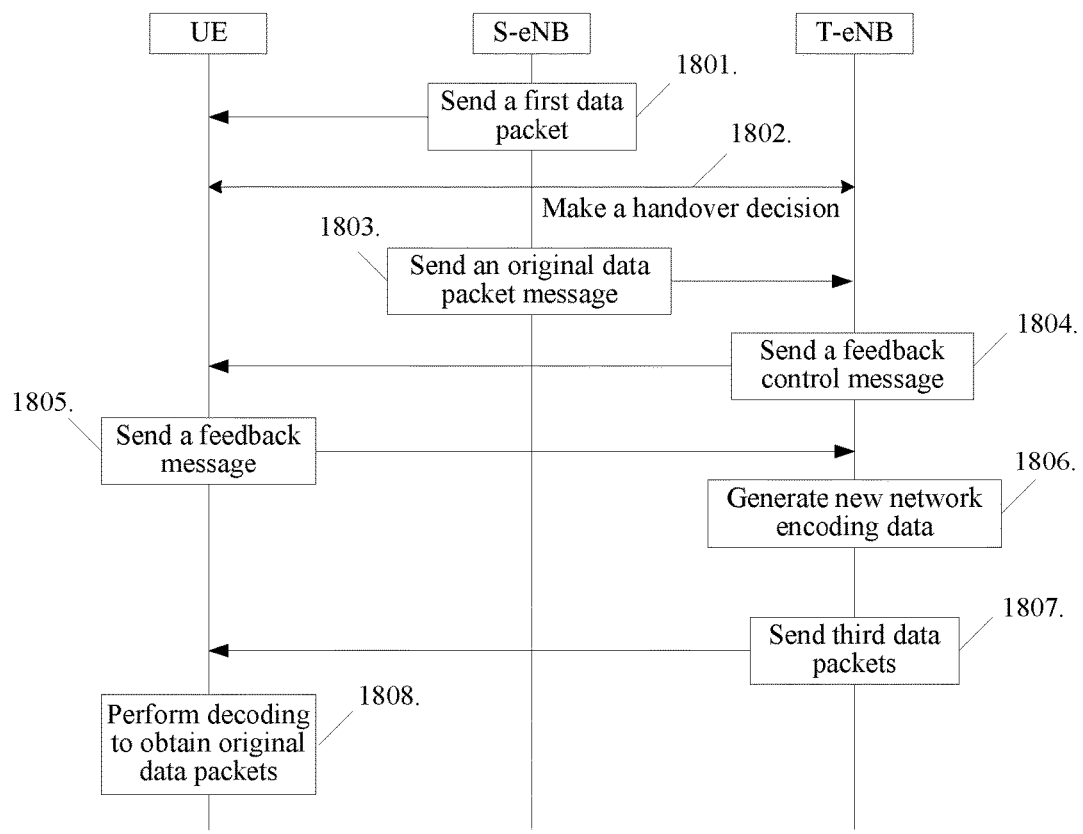
FIG. 26 shows a schematic diagram of another embodiment of a method for data transmission according to the present invention.
Figure 27:
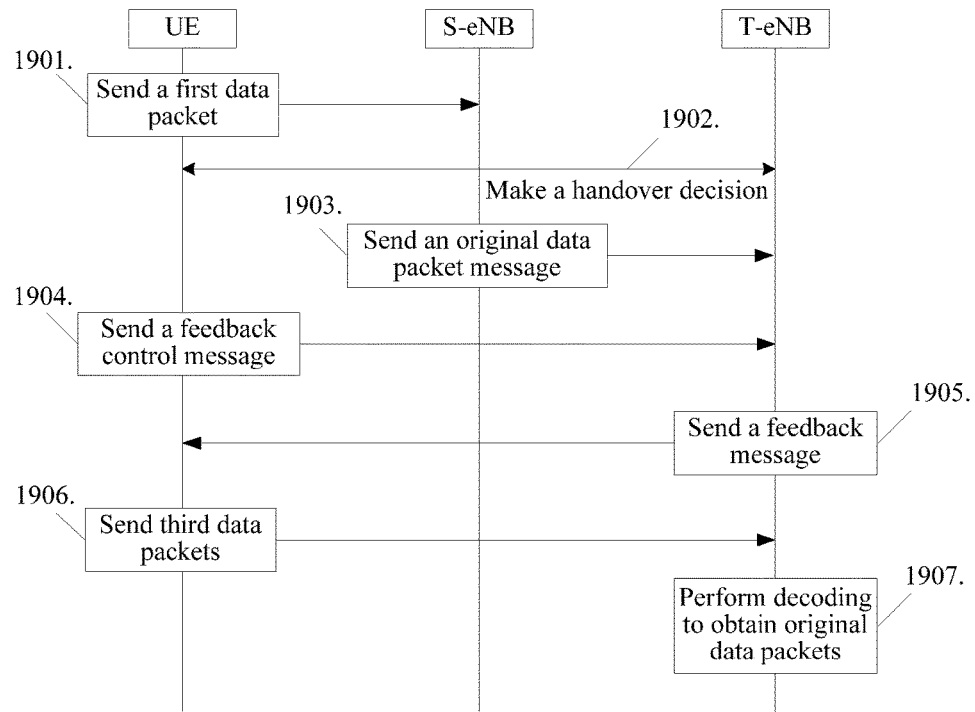
FIG. 27 shows a schematic diagram of another embodiment of a method for data transmission according to the present invention.

FIG. 25 to FIG. 27 specifically describe system embodiments of the present invention:

FIG. 25 shows an embodiment of a system according to the present invention. In the system, a first network device is a source base station S-eNB, and a second network device is a target base station T-eNB. It should be understood that signaling exchange steps in the figure are only exemplary.

Step 1701: The S-eNB sends at least one first data packet to UE, where the first data packet is obtained by encoding an original data packet, the original data packet is data that needs to be sent to the UE, and a quantity of first data packets is greater than a quantity of original data packets.

In an embodiment of the present invention, a specific step of that the first data packet is obtained by encoding an original data packet may include:

obtaining a first codebook, where the first codebook includes a codebook vector, and encoding the original data packet according to the codebook vector to obtain the first data packet.

It should be understood that, a method for obtaining the first codebook is not specifically limited in the present invention. Optionally, the first codebook may be stored in the S-eNB, or determined by the S-eNB according to a specific network status, or the S-eNB receives a message that is sent by another device and that includes the first codebook, so as to obtain the first codebook.

In an embodiment of the present invention, a specific encoding manner may be performing point multiplication for an original data packet by using a codebook vector, to obtain a first data packet. For ease of description and understanding, an available codebook is $A_{L \times n}$, an encoding matrix consisting of M codebook vectors selected from L codebooks in $A_{L \times n}$ is $A_{M \times n}$, and an original data packet forms a vector $\alpha$, where A is an M×n matrix, and a is an n-dimensional vector. If indicated in a form of a matrix, a manner for point multiplication of each codebook and the vector $\alpha$ formed by the original data packet may be indicated as:

$$\beta_{M \times 1} = A_{M \times n} \alpha_{n \times 1}$$

where each element of an obtained vector $\beta_{M \times 1}$ is a first data packet. M>n.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

Further, the S-eNB obtains a corresponding identifier of a first data packet corresponding to each codebook vector, where each first data packet includes a respective corresponding identifier, so that the UE determines, according to the corresponding identifier of the first data packet, a codebook vector corresponding to each first data packet, to reconstruct the original data packet. As in the foregoing example, an $i^{th}$ element in the vector $\beta_{M \times 1}$ corresponds to an $i^{th}$ first data packet, which is obtained through point multiplication of an $i^{th}$ row in A and $\alpha$ of the original data packet. Correspondingly, the $i^{th}$ first data packet corresponds to a codebook vector in the $i^{th}$ row in A.

Optionally, i is used as the corresponding identifier, and set in each first data packet, and the first data packet is sent to the UE.

It should be understood that, the present invention is not limited to using i as the corresponding identifier and setting i in the first data packet, and an identifier in another form may be used, or another manner may be used so that the UE obtains the codebook vector corresponding to each first data packet.

Step 1702: Make a handover decision. The S-eNB, T-eNB, and the UE determine that the user equipment UE needs to be handed over from the S-eNB to the T-eNB.

It should be understood that, there are multiple processes of decision-making and negotiation of the S-eNB and the T-eNB, aimed at ensuring that a service of the UE is handed over from the S-eNB to the T-eNB. This step may be initiated by, but not limited to, the S-eNB, the T-eNB, the UE, or another device. The handover may be performed because the UE moves into a coverage area of the T-eNB or a communications device determines signal strength.

Step 1703: The S-eNB sends a feedback control message to the UE, where the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE.

In an embodiment of the present invention, the indication information of the remaining sending quantity may be in, but not limited to, the following forms:

the remaining sending quantity k; or a quantity of data packets that have been correctly received by the UE; or a proportion at which the UE loses a data packet; or a proportion at which the UE correctly receives a data packet.

Step 1704: The UE sends a feedback message to the S-eNB, where the feedback message includes the indication information of the remaining sending quantity.

In the handover process, the S-eNB needs to notify the T-eNB of a message that is in downlink communication, so that the UE reconstructs an original signal (original data packets) according to a first data packet or a third data packet sent by the S-eNB and the T-eNB. The S-eNB sends a feedback control message to the UE, so that the UE feeds back indication information of a remaining sending quantity k.

It should be understood that, the present invention does not limit the indication information of the remaining sending quantity only to the several forms above, the indication information of the remaining sending quantity is aimed at indicating a quantity of first data packets that the T-eNB continues to send to the UE, and indication information of the remaining sending quantity that achieves the aim all belongs to the protection scope of the present invention.

Step 1705: The S-eNB sends an original data packet message to the T-eNB, to instruct the T-eNB to continue to send a first data packet to the UE according to the original data packet message, where the original data packet message includes the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets.

It should be understood that, a specific form of the location identifier of the second data packet is not limited in the present invention. Optionally, the location identifier is an index that is set in the second data packet.

For the sending, by the S-eNB, an original data packet message to the T-eNB in step 1705, the present invention further gives two corresponding different implementation manners:

Implementation Manner 1:

The second data packet is all the original data packets, the original data packet message further includes a codebook vector usage message, and the codebook vector usage message is used to indicate codebook vectors used by the T-eNB when the T-eNB encodes the original data packets by using the first codebook, so that the T-eNB obtains (generates) third data packets that the T-eNB needs to continue to send to the UE, where each original data packet includes a location identifier, so that the T-eNB determines, according to the location identifier, a location of each original data packet during encoding.

In this implementation manner, the S-eNB sends all original data packet messages to the T-eNB, so that the T-eNB continues to encode the original data packets according to the original data packets and the used codebook vectors.

Implementation Manner 2:

A quantity of second data packets is the remaining sending quantity k, the original data packet message further includes a codebook vector usage message, and the codebook vector usage message is used to indicate codebook vectors used by the T-eNB when the T-eNB encodes the original data packets by using the first codebook, where each original data packet includes a location identifier, so that the T-eNB determines, according to the location identifier, a location of each original data packet during encoding.

In this implementation manner, a quantity of second data packets is the remaining sending quantity k, and after the k second data packets are sent to the T-eNB, the T-eNB may perform encoding according to the second data packets to obtain third data packets, so that the UE performs decoding according to the first data packet sent by the S-eNB and the third data packets sent by the T-eNB, to obtain the original data packets.

Step 1706: The T-eNB encodes the second data packets, to obtain (generate) at least k third data packets, where m≥k.

In an embodiment of the present invention, before the second data packet is encoded, a first codebook is obtained, where the first codebook includes a codebook vector, and the first codebook is used to encode the second data packet.

It should be understood that, a method for obtaining the first codebook is not specifically limited in the present invention. Optionally, the first codebook may be stored in the T-eNB, or determined by the S-eNB according to a specific network status, or the S-eNB receives a message that is sent by another device and that includes the first codebook, so as to obtain the first codebook.

Optionally, the original data packet message further includes a codebook vector usage message, the codebook vector usage message is used to indicate codebook vectors used when the original data packets are encoded, and used encoding vectors are determined from the first codebook, to encode the original data packets.

Each original data packet further includes a location identifier, and a location of each original data packet during encoding by the S-eNB is determined according to the location identifier; and the original data packets are encoded according to the used codebook vectors, the original data packets, and location identifiers:

an $i^{th}$ element in a $j^{th}$ codebook vector is separately multiplied by m original data packets whose location identifiers indicate i, and all m obtained multiplication results are added up, to obtain a third data packet corresponding to the $j^{th}$ codebook vector, where the $j^{th}$ codebook vector is one of the used codebook vectors.

In an embodiment of the present invention, each codebook vector and a corresponding identifier of a third data packet are obtained, and set in the corresponding third data packet, so that the UE determines, according to the corresponding identifier of the third data packet, a codebook vector corresponding to each third data packet, to reconstruct an original data packet.

It should be understood that, in step 1705 and step 1706, the present invention does not limit the original data packet message to including only the content above. The second data packet is m data packets selected from the original data packets, and the present invention gives two possible examples:

Implementation Manner 1:

The original data packet message further includes a m original data packets, and a value of m is a quantity of all the original data packets for encoding.

In this case, the encoding method may be the same as that in the embodiment given in step 101 in the foregoing embodiment, and is equivalent to a form of step 203, that is, all the original data packets are encoded, to obtain third data packets:

$$\beta_{P \times 1} = A_{P \times n} \alpha_{n \times 1}$$

where $A_{P \times n}$ consists of used codebook vectors, P third data packets are obtained, and P≥k. Or Implementation Manner 2:

The original data packet message further includes m original data packets, and a value of m is the quantity k of first data packets that are needed to continue to send to the UE.

In this case, for ease of description and understanding, a matrix form may also be used:

$$\beta'_{Q \times 1} = A_{Q \times n} \alpha_{k\text{-}sparse}$$

where $A_{Q \times n}$ consists of used codebook vectors, $\alpha_{k\text{-}sparse}$ is an n-dimensional vector, an $i^{th}$ element of $\alpha_{k\text{-}sparse}$ is an original data packet whose location identifier indicates i, other locations are all 0, and Q≥k.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

After the original data packets are encoded according to the two implementation manners, third data packets are obtained, and sent to the UE, so that the UE obtains the original data packets. It should be understood that, according to the two different implementation manners, the UE has different decoding manners. When the technical solution of the present invention is implemented, the network side device or the UE may send a message to the other party, to notify the peer device of an encoding manner for the third data packets included in the sent original data packet message. In an embodiment, this embodiment of the present invention is implemented in a preset manner, and the preset manner is an encoding manner for original data packets that is agreed by a network device and the UE device.

It should be understood that, for ease of description, in this embodiment, data packets that are generated by the T-eNB through encoding and that are to be sent to the UE are referred to as third data packets. Essentially, for the implementation manner 1, characteristics of the third data packets are similar to that of the first data packet, both of which are obtained through point multiplication of all the original data packets and codebook vectors, where the codebook vectors are codebook vectors that have not been used previously, and the third data packets in the implementation manner 1 may be considered as newly generated (encoded) first data packets. For the implementation manner 2, characteristics of the third data packets are different from that of the first data packet, and the third data packets are obtained through point multiplication of some original data packets and codebook vectors. Correspondingly, for the implementation manner 1 and the implementation manner 2, the UE side has different decoding manners.

Step 1707: The T-eNB sends the third data packets to the UE. The third data packets are used by the UE to obtain original data packets.

Step 1708: Decode the first data packet sent by the S-eNB and the third data packets sent by the T-eNB, to obtain the original data packets.

In an embodiment of the present invention, a specific decoding manner may be:

obtaining a first codebook, where the first codebook includes a codebook vector;

obtaining a corresponding identifier included in the first data packet sent by the S-eNB, where the corresponding identifier indicates a codebook vector corresponding to each first data packet;

obtaining corresponding identifiers included in the third data packets sent by the T-eNB, where the corresponding identifiers indicate a codebook vector corresponding to each third data packet; and decoding, according to the first codebook, the corresponding identifier included in the first data packet sent by the S-eNB, and the corresponding identifiers included in the third data packets sent by the T-eNB, the first data packet sent by the S-eNB and the third data packets sent by the T-eNB, to obtain the original data packets.

Corresponding to the two implementation manners of step 1706, this embodiment gives two different decoding manners, where the decoding manners are determined according to characteristics of the third data packets sent by the T-eNB:

Decoding Manner 1:

If a quantity of first data packets that need to be sent to the UE is S, and the remaining sending quantity is k, a quantity of first data packets that have been sent by the S-eNB before the handover is T=S−k. When the original data packet message sent from the S-eNB to the T-eNB includes m original data packets, where a value of m is a quantity of all original data packets for encoding, first data packets $\beta_{11}$, $\beta_{12}$, $\beta_{13}$, . . . , and $\beta_{1T}$ sent by the S-eNB and received on the UE side and third data packets $\beta_{21}$, $\beta_{22}$, $\beta_{23}$, . . . , and $\beta_{2k}$ sent by the T-eNB and received on the UE side jointly form an equation, that is:

$$\begin{bmatrix} \beta_{11} \\ \beta_{12} \\ \vdots \\ \beta_{1T} \\ \beta_{21} \\ \beta_{22} \\ \vdots \\ \beta_{2k} \end{bmatrix} = A_{decode} \alpha.$$

In obtained α, each element is an original data packet. It should be understood that, S is at least greater than a length of the original data packets, so as to ensure that the original data packets can be obtained by decoding according to a value of S and the matrix $A_{decode}$.

Decoding Manner 2:

If a quantity of first data packets that need to be sent to the UE is S, and the remaining sending quantity is k, a quantity of first data packets that have been sent by the S-eNB before the handover is T=S−k. When the original data packet message sent from the S-eNB to the T-eNB includes m original data packets, where a value of m is the quantity k of first data packets that the T-eNB needs to continue to send to the UE, first data packets $\gamma_{11}$, $\gamma_{12}$, $\gamma_{13}$, . . . , and $\gamma_{1P}$ sent by the S-eNB and received on the UE side and T-eNB sent by third data packets $\gamma_{21}$, $\gamma_{22}$, $\gamma_{23}$, . . . , and $\gamma_{2Q}$ sent by the T-eNB and received on the UE side are decoded:

$$\begin{bmatrix} \gamma_{21} \\ \gamma_{22} \\ \vdots \\ \gamma_{2Q} \end{bmatrix} = A_{Q \times n} \alpha_{k-sparse} \text{ and } \begin{bmatrix} \gamma_{11} \\ \gamma_{12} \\ \vdots \\ \gamma_{1P} \end{bmatrix} = A_{P \times n} \alpha_{n \times 1}.$$

In an embodiment, a quantity of original data packets included in obtained $\alpha_{k-sparse}$ is k, and other locations are 0. Then all the original data packets are obtained by decoding according to the original data packets determined by $\alpha_{k-sparse}$ and an equation $$\begin{bmatrix} \gamma_{11} \\ \gamma_{12} \\ \vdots \\ \gamma_{1P} \end{bmatrix} = A_{P \times n} \alpha_{n \times 1}.$$

It should be understood that, a specific decoding manner in the decoding manner 2 is not limited to the foregoing embodiment, and the present invention does not limit another specific decoding manner.

It should be understood that, the present invention is not limited to the two decoding methods in the decoding manner 1 and the decoding manner 2, and during specific implementation, each matrix in the example may be an array, a sequence, or binary code stored in the UE apparatus, and a decoding operation may be a mathematical operation in another form.

In this embodiment, a specific handover manner in a case in which in a downlink data sending process, when UE determines that a network device handover occurs, the UE receives a data packet that is sent by an S-eNB is described, and in this embodiment, manners and related steps that the S-eNB queries, by sending a feedback control message, a status of first data packet receiving by the UE, and sends, according to a feedback message returned by the UE, a second data packet to a T-eNB, the T-eNB generates a third data packet through encoding according to the second data packet and sends the third data packet to the UE, and the UE receives and decodes a first data packet sent by the S-eNB and the third data packet sent by the T-eNB are described, ensuring that when a fountain code encoding manner is used, no data is lost in a cell handover process, reducing data packet retransmission, improving handover efficiency, and resolving a problem that fountain code handover cannot be implemented in a network in a conventional handover form.

FIG. 26 shows an embodiment of a system according to the present invention. In the system, a first network device is a source base station S-eNB, and a second network device is a target base station T-eNB. It should be understood that signaling exchange steps in the figure are only exemplary.

Step 1801 is the same as 1701 in the embodiment shown in FIG. 26, and details are not described herein again.

Step 1802 is the same as 1702 in the embodiment shown in FIG. 26, and details are not described herein again.

Step 1803: The S-eNB sends an original data packet message to the T-eNB, to instruct the T-eNB to continue to send a first data packet to the UE according to the original data packet message, where the original data packet message includes all the original data packets and a codebook vector usage message, and the codebook vector usage message is used to indicate codebook vectors used by the T-eNB when the T-eNB encodes the original data packets by using the codebook vectors.

In an embodiment, the original data packet message is all the original data packet messages.

Step 1804: The T-eNB sends a feedback control message to the UE, where the feedback control message is used to instruct the UE to send indication information of a remaining sending quantity, and the remaining sending quantity k is a quantity of first data packets that the T-eNB continues to send to the UE.

Step 1805: The T-eNB receives a feedback message sent by the UE, where the feedback message includes the indication information of the remaining sending quantity.

The indication information of the remaining sending quantity is:

the remaining sending quantity k; or a quantity of data packets that have been correctly received by the UE; or a proportion at which the UE loses a data packet; or a proportion at which the UE correctly receives a data packet.

Step 1806: The T-eNB encodes the original data packets according to the indication information of the remaining sending quantity and the original data packet message, to obtain (generate) at least k third data packets.

In an embodiment of the present invention, a specific step of encoding the original data packets to obtain third data packets may include:

obtaining a first codebook, where the first codebook includes a codebook vector, and the first codebook is used to encode the original data packets; and encoding the original data packets according to codebook vectors to obtain the third data packets.

It should be understood that, a method for obtaining the first codebook is not specifically limited in the present invention. Optionally, the first codebook may be stored in the S-eNB, or determined by the S-eNB according to a specific network status, or the S-eNB receives a message that is sent by another device and that includes the first codebook, so as to obtain the first codebook.

Optionally, the original data packet message further includes a codebook vector usage message, the codebook vector usage message is used to indicate codebook vectors used when the original data packets are encoded, used encoding vectors are determined from the first codebook according to the codebook vector usage message, and the original data packets are encoded by using the determined codebook vectors.

Each original data packet further includes a location identifier, and a location of each original data packet during encoding by the S-eNB is determined according to the location identifier; and the original data packets are encoded according to the used codebook vectors, the original data packets, and location identifiers:

m original data packets are determined, and a location identifier corresponding to each original data packet in the m original data packets is determined, where the location identifier is used to indicate a location of the corresponding original data packet in all the original data packets, m≥k, and a value of k is the remaining sending quantity; and an $i^{th}$ element in a $j^{th}$ codebook vector is separately multiplied by m original data packets whose location identifiers indicate i, to obtain m multiplication results, and all the m obtained multiplication results are added up, to obtain a third data packet corresponding to the $j^{th}$ codebook vector, where the $j^{th}$ codebook vector is one of the used codebook vectors.

In an embodiment of the present invention, each codebook vector and a corresponding identifier of a third data packet are obtained, and set in the corresponding third data packet, so that the UE determines, according to the corresponding identifier of the third data packet, a codebook vector corresponding to each third data packet, to reconstruct an original data packet.

It should be understood that, a specific encoding manner in step 1806 is not limited in the present invention, and another manner may be used to encode data. Correspondingly, the UE should have a corresponding method in a decoding process to perform decoding to obtain an original data packet. Specifically, the present invention gives two possible examples, and reference may be made to the method of step 203 shown in FIG. 2:

Implementation Manner 1:

A value of m is a quantity of all the original data packets. In this case, the encoding method may be the same as that in the embodiment given in step 101 shown in FIG. 1, that is, all the original data packets are encoded, to obtain third data packets:

$$\beta'_{P \times 1} = A_{P \times n} \alpha_{n \times 1}$$

where $A_{P \times n}$ consists of used codebook vectors, P third data packets are obtained, and P≥k. Or Implementation Manner 2:

A value of m is the quantity k of first data packets that are needed to continue to send to the terminal apparatus.

In this case, for ease of description and understanding, a matrix form may also be used:

$$\beta'_{Q \times 1} = A_{Q \times n} \alpha_{k\text{-}sparse}$$

where $A_{Q \times n}$ consists of used codebook vectors, $\alpha_{k\text{-}sparse}$ is an n-dimensional vector, an $i^{th}$ element of $\alpha_{k\text{-}sparse}$ is an original data packet whose location identifier indicates i, other locations are all 0, and Q≥k.

It should be understood that, the matrix form in this embodiment of the present invention is intended only for ease of description. In an implementation process of the present invention, a selected codebook or matrix may be, but not limited to, an array or a sequence in another form that is stored on a network side/terminal, and corresponding matrix multiplication and involved encoding operations may be mathematical operations between one number and another number that are performed on the network side or terminal side and that can achieve encoding objectives.

After the original data packets are encoded according to the two implementation manners, third data packets are obtained, and sent to the UE, so that the UE obtains the original data packets. It should be understood that, according to the two different implementation manners, the UE has different decoding manners. When the technical solution of the present invention is implemented, the T-eNB may send a message, to notify the UE of an encoding manner for the third data packets included in the sent original data packet message. In an embodiment, this embodiment of the present invention is implemented in a preset manner, and the preset manner is an encoding manner for original data packets that is agreed by a network device and the UE device.

Further, a corresponding identifier of a third data packet corresponding to each codebook vector is obtained, and set in the corresponding third data packet, so that the UE determines, according to the corresponding identifier of the third data packet, a codebook vector corresponding to each third data packet, to reconstruct an original data packet.

As in the foregoing example, an $i^{th}$ element in the vector $\beta_{M \times 1}$ corresponds to an $i^{th}$ third data packet, which is obtained through point multiplication of an $i^{th}$ row in A and α of the original data packet. Correspondingly, the $i^{th}$ third data packet corresponds to a codebook vector in the $i^{th}$ row in A.

Optionally, i is used as the corresponding identifier, and set in each third data packet, and the third data packet is sent to the UE.

It should be understood that, the present invention is not limited to using i as the corresponding identifier and setting i in the third data packet, and an identifier in another form may be used, or another manner may be used so that the UE obtains the codebook vector corresponding to each third data packet.

Step 1807: Continue to send the third data packets to the UE according to the original data packet message.

Step 1808 is the same as 1708 in the embodiment shown in FIG. 26, and details are not described herein again.

In this embodiment, a specific handover manner in a case in which in a downlink data sending process, when UE determines that a network device handover occurs, the UE receives a data packet that is sent by an S-eNB is described, and in this embodiment, manners and related steps that the S-eNB queries, by sending a feedback control message, a status of first data packet receiving by the UE, and sends, according to a feedback message returned by the UE, a second data packet to a T-eNB, the T-eNB generates a third data packet through encoding according to the second data packet and continues to send the third data packet to the UE, and the UE decodes and receives a first data packet sent by the S-eNB and the third data packet sent by the T-eNB are described, ensuring that when a fountain code encoding manner is used, no data is lost in a cell handover process, reducing data packet retransmission, improving handover efficiency, and resolving a problem that fountain code handover cannot be implemented in a network in a conventional handover form.

FIG. 27 shows another embodiment of a system according to the present invention. In this embodiment, a method for uplink data transmission when UE is handed over from an S-eNB to a T-eNB is described.

In the system, a first network device is the source base station S-eNB, and a second network device is the target base station T-eNB. It should be understood that signaling exchange steps in the figure are only exemplary.

Step 1901: The S-eNB receives at least one first data packet sent by the UE, where the first data packet is obtained by encoding an original data packet, and the at least one first data packet is used to perform decoding to obtain the original data packet.

Optionally, that the first data packet is obtained by encoding an original data packet includes: obtaining the original data packet, where the original data packet is a message that the UE needs to send to the S-eNB or the T-eNB;

obtaining a first codebook, where the first codebook is used to encode the original data packet; and encoding the original data packet according to the original data packet and the first codebook, to obtain the first data packet.

Step 1902: Determine that the UE is handed over from the S-eNB to the T-eNB

It should be understood that, there are multiple processes of decision-making and negotiation of the S-eNB and the T-eNB, aimed at ensuring that a service of the UE is handed over from the S-eNB to the T-eNB. Details are not described herein. This step may be initiated by, but not limited to, the S-eNB, the T-eNB, the UE, or another device. The handover may be performed because the UE moves into a coverage area of the T-eNB or a communications device determines signal strength.

Step 1903: The S-eNB sends the first data packet to the T-eNB, so that the T-eNB may restore the original data packet according to the first data packet.

Step 1904: The UE sends a feedback control message to the T-eNB, where the feedback control message is used to instruct the T-eNB to send indication information of a remaining sending quantity, and the remaining sending quantity k is at least greater than or equal to a difference between a quantity of first data packets needed by the UE to correctly restore all original data packets and a quantity of first data packets correctly received by the UE. Optionally, the indication information of the remaining sending quantity is:

the remaining sending quantity k; or a quantity of data packets that have been correctly received by the first network device; or a proportion at which the first network device loses a data packet; or a proportion at which the first network device correctly receives a data packet.

Step 1905: The T-eNB sends a feedback message to the UE, where the feedback message includes the indication information of the remaining sending quantity.

Step 1906: The UE sends third data packets to the T-eNB.

Step 1907: The T-eNB decodes the third data packets sent by the UE and the first data packet sent by the first network device, to obtain the original data packets.

In this embodiment, a process in which in an uplink data sending process, when a first network device determines that a network device handover occurs, the first network device sends a received first data packet to a second network device, UE obtains, by sending a feedback control message, a quantity of first data packets that are needed to continue to send to a network side device, and when the second network device determines that the network device handover occurs, the second network device receives a third data packet sent by the UE is described. In this embodiment, it is ensured that when a fountain code encoding manner is used, no data is lost in a cell handover process, reducing data packet retransmission, improving handover efficiency, and resolving a problem that fountain code handover cannot be implemented in a network in a conventional handover form.

The module division of the apparatuses in the foregoing embodiments is logical division of functions, and during specific implementation, some modules may be physically implemented by a same component.

Figure 28:
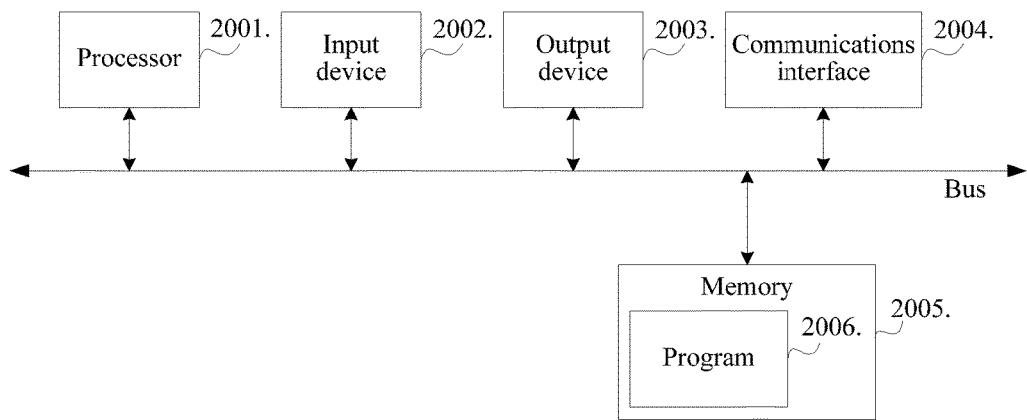
FIG. 28 shows a schematic diagram of an embodiment of an apparatus for data transmission according to the present invention.

FIG. 28 shows an embodiment of an apparatus for data transmission. The apparatus for data transmission may be a network device or user equipment.

The computer system may be specifically a processor based computer, for example, a general-purpose personal computer (PC), a portable device such as a tablet computer, or a smartphone.

More specifically, the computer system may include a bus, a processor 2001, an input device 2002, an output device 2003, a communications interface 2004, and a memory 2005. The processor 2001, the input device 2002, the output device 2003, the communications interface 2004, and the memory 2005 are mutually connected by using the bus.

The bus may include a channel, to transfer information between the components of the computer system.

The processor 2001 may be a general-purpose processor, for example, a central processing unit (CPU), a network processor (Network Processor, NP for short), or a microprocessor, or may be an application-specific integrated circuit (application-specific integrated circuit, ASIC), or one or more integrated circuits for controlling execution of programs of solutions of the present invention, or may be a digital signal processor (DSP), an application-specific integrated circuit (ASIC), a field programmable gate array (FPGA), or another programmable logical device, discrete gate or transistor logical device, or discrete hardware component.

The memory 2005 stores a program for executing the technical solutions of the present invention, and may further store an operating system and another application program. Specifically, the program may include program code, where the program code includes a computer operation instruction. More specifically, the memory 1805 may be a read-only memory (read-only memory, ROM), a static storage device of another type that can store static information and an instruction, a random access memory (random access memory, RAM), a dynamic storage device of another type that can store information and an instruction, a magnetic disk storage, or the like.

The input device 2002 may include an apparatus for receiving data and information input by a user, for example, a keyboard, a mouse, a camera, a scanner, a light pen, a voice input apparatus, or a touchscreen.

The output device 2003 may include an apparatus allowed to output information to the user, for example, a display screen, a printer, or a speaker.

The communications interface 2004 may include any apparatus that uses a transceiver, so as to communicate with another device or a communications network, for example, the Ethernet, a radio access network (RAN), or a wireless local area network (WLAN).

The processor 2001 executes the program stored in the memory 2005, to implement a method for data transmission provided in any embodiment of the present invention and any apparatus in the embodiments.

It should be understood that, in the present invention, a feedback message indicates a quantity of first data packets that a terminal or a network side device continues to send, and for ease of description, an original data packet between the terminal and the network side device after a handover is sent by using a third data packet. Although the third data packet has different encoding manners, a quantity of third data packets to be sent is always determined according to an instruction of continuing to send a first data packet.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method for data transmission, comprising:
   sending, by a first network device, at least one first data packet to UE, wherein the first data packet is obtained by encoding an original data packet, the original data packet is data that needs to be sent to the UE, and a quantity of first data packets is greater than a quantity of original data packets;
   determining, by the first network device, that the user equipment UE needs to be handed over from the first network device to a second network device;
   sending a feedback control message to the UE, wherein the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE;
   receiving a feedback message sent by the UE, wherein the feedback message comprises the indication information of the remaining sending quantity; and
   sending an original data packet message to the second network device, to instruct the second network device to continue to send a first data packet to the UE according to the original data packet message, wherein the original data packet message comprises the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets, wherein that the first data packet is obtained by encoding an original data packet comprises:
      obtaining a first codebook, wherein the first codebook comprises a codebook vector, and encoding the original data packet according to the codebook vector to obtain the first data packet; and
      obtaining a corresponding identifier of a first data packet corresponding to each codebook vector, wherein each first data packet comprises a respective corresponding identifier, so that the UE determines, according to the corresponding identifier of the first data packet, a codebook vector corresponding to each first data packet, to reconstruct the original data packet.

2. The method according to claim 1, wherein the second data packet is all the original data packets, the original data packet message further comprises a codebook vector usage message, and the codebook vector usage message is used to indicate codebook vectors used by the second network device when the second network device encodes the original data packets by using the first codebook, so that the second network device obtains the first data packet that the second network device needs to continue to send to the UE, wherein each original data packet comprises a location identifier, so that the second network device determines, according to the location identifier, a location of each original data packet during encoding.

3. The method according to claim 1, wherein a quantity of second data packets is the remaining sending quantity k, the original data packet message further comprises a codebook vector usage message, and the codebook vector usage message is used to indicate codebook vectors used by the second network device when the second network device encodes the original data packets by using the first codebook, wherein each original data packet comprises a location identifier, so that the second network device determines, according to the location identifier, a location of each original data packet during encoding.

4. A method for data transmission by a terminal, comprising:
   receiving, by the terminal, at least one first data packet sent by a first network device, wherein the first data packet is obtained by encoding an original data packet, and the at least one first data packet is used to perform decoding to obtain the original data packet;
   determining that the terminal is handed over from the first network device to a second network device;
   receiving a feedback control message, wherein the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE;
   sending a feedback message to the first network device or the second network device, wherein the feedback message comprises the indication information of the remaining sending quantity;
   receiving k third data packets sent by the second network device; and
   decoding the first data packet sent by the first network device and the third data packets sent by the second network device, to obtain the original data packets, wherein the decoding the first data packet sent by the first network device and the third data packets sent by the second network device, to obtain the original data packets comprises:
      obtaining a first codebook, wherein the first codebook comprises a codebook vector;
      obtaining a corresponding identifier comprised in the first data packet sent by the first network device, wherein the corresponding identifier indicates a codebook vector corresponding to each first data packet;
      obtaining corresponding identifiers comprised in the third data packets sent by the second network device, wherein the corresponding identifiers indicate a codebook vector corresponding to each third data packet; and decoding, according to the first codebook, the corresponding identifier comprised in the first data packet sent by the first network device, and the corresponding identifiers comprised in the third data packets sent by the second network device, the first data packet sent by the first network device and the third data packets sent by the second network device, to obtain the original data packets.

5. A network device, comprising:
a transmitter, configured to send at least one first data packet to UE, wherein the first data packet is obtained by encoding an original data packet, the original data packet is data that needs to be sent to the UE, and a quantity of first data packets is greater than a quantity of original data packets;
a processor, configured to determine that the user equipment UE needs to be handed over from the first network device to a second network device;
the transmitter, further configured to send a feedback control message to the UE, wherein the feedback control message is used to instruct the UE to send indication information of a remaining sending quantity k, and the remaining sending quantity k is at least greater than or equal to a difference between a quantity of first data packets needed by the UE to correctly restore all the original data packets and a quantity of first data packets correctly received by the UE;
a receiver, configured to receive a feedback message sent by the UE, wherein the feedback message comprises the indication information of the remaining sending quantity; and
the transmitter, further configured to send an original data packet message to the second network device, to instruct the second network device to continue to send a first data packet to the UE according to the original data packet message, wherein the original data packet message comprises the indication information of the remaining sending quantity k, a second data packet, and a location identifier of the second data packet, the second data packet is m data packets selected from the original data packets, m≥k, and the location identifier of the second data packet is identifiers of locations of the selected data packets in the original data packets,
the processor further configured to obtain a first codebook, wherein the first codebook comprises a codebook vector, and encode the original data packet according to the codebook vector to obtain the first data packet, wherein
the processor further configured to obtain a corresponding identifier of a first data packet corresponding to each codebook vector, wherein each first data packet comprises a respective corresponding identifier, so that the UE determines, according to the corresponding identifier of the first data packet, a codebook vector corresponding to each first data packet, to reconstruct the original data packet.

6. The network device according to claim 5, wherein the second data packet is all the original data packets, the original data packet message further comprises a codebook vector usage message, and the codebook vector usage message is used to indicate codebook vectors used by the second network device when the second network device encodes the original data packets by using the first codebook, so that the second network device obtains the first data packet that the second network device needs to continue to send to the UE, wherein each original data packet comprises a location identifier, so that the second network device determines, according to the location identifier, a location of each original data packet during encoding.

7. The network device according to claim 5, wherein a quantity of second data packets is the remaining sending quantity k, the original data packet message further comprises a codebook vector usage message, and the codebook vector usage message is used to indicate codebook vectors used by the second network device when the second network device encodes the original data packets by using the first codebook, wherein each original data packet comprises a location identifier, so that the second network device determines, according to the location identifier, a location of each original data packet during encoding.

8. A terminal, comprising:
a receiver, configured to receive at least one first data packet sent by a first network device, wherein the first data packet is obtained by encoding an original data packet, and the at least one first data packet is used to perform decoding to obtain the original data packet;
a processor, configured to determine that the terminal is handed over from the first network device to a second network device;
the receiver, further configured to receive a feedback control message, wherein the feedback control message is used to instruct the UE to send indication information of a remaining sending quantity, and the remaining sending quantity k is at least greater than or equal to a difference between a quantity of first data packets needed by the UE to correctly restore all original data packets and a quantity of first data packets correctly received by the UE;
a transmitter, configured to send a feedback message to the first network device or the second network device, wherein the feedback message comprises the indication information of the remaining sending quantity;
the transmitter, further configured to receive k third data packets sent by the second network device; and
the processor, further configured to decode the first data packet sent by the first network device and the first data packets sent by the second network device, to obtain the original data packets, wherein
the processor further configured to obtain a first codebook, wherein the first codebook comprises a codebook vector;
the processor further configured to obtain a corresponding identifier comprised in the first data packet sent by the first network device, wherein the corresponding identifier indicates a codebook vector corresponding to each first data packet; and
the processor further configured to obtain corresponding identifiers comprised in the third data packets sent by a third network device, wherein the corresponding identifiers indicate a codebook vector corresponding to each third data packet; and
the processor further configured to decode, according to the first codebook, the corresponding identifier comprised in the first data packet sent by the first network device, and the corresponding identifiers comprised in the third data packets sent by the second network device, the first data packet sent by the first network device and the third data packets sent by the second network device, to obtain the original data packets.

* * * * *